United States Patent
Satake et al.

(10) Patent No.: US 7,507,524 B2
(45) Date of Patent: Mar. 24, 2009

(54) AZO-METAL CHELATE DYE AND OPTICAL RECORDING MEDIUM

(75) Inventors: Kenichi Satake, Tokyo (JP); Hisashi Shoda, Tokyo (JP); Naoyuki Uchida, Tokyo (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 354 days.

(21) Appl. No.: 11/218,480

(22) Filed: Sep. 6, 2005

(65) Prior Publication Data

US 2007/0054219 A1    Mar. 8, 2007

(51) Int. Cl.
*G11B 7/24* (2006.01)

(52) U.S. Cl. .......................... 430/270.16; 430/270.19; 430/945; 428/64.8; 369/288; 369/284

(58) Field of Classification Search ........................ None
See application file for complete search history.

(56) References Cited

U.S. PATENT DOCUMENTS

| | | |
|---|---|---|
| 6,225,023 B1 | 5/2001 | Okamoto et al. |
| 6,284,877 B1 | 9/2001 | Okamoto et al. |
| 6,551,682 B1 | 4/2003 | Tosaki et al. |
| 2006/0035171 A1* | 2/2006 | Satake et al. ........... 430/270.16 |
| 2007/0054219 A1 | 3/2007 | Satake et al. |

FOREIGN PATENT DOCUMENTS

| | | | |
|---|---|---|---|
| EP | 0 844 243 | * | 5/1998 |
| JP | 11166125 | * | 6/1999 |
| JP | 2000-309722 | * | 11/2000 |
| JP | 2004-042504 | | 2/2004 |
| JP | 2005-120350 | | 5/2005 |
| WO | 00/55136 | | 9/2000 |
| WO | 2005/026263 A1 | | 3/2005 |

OTHER PUBLICATIONS

International Standard ISO 105-B02, 1994 (35 pages).*
U.S. Appl. No. 12/063,488, filed Feb. 11, 2008, Shoda, et al.

* cited by examiner

*Primary Examiner*—Martin J Angebranndt
*Assistant Examiner*—Anna L Verderame
(74) *Attorney, Agent, or Firm*—Oblon, Spivak, McClelland, Maier & Neustadt, P.C.

(57) ABSTRACT

The azo-metal chelate dye of the present invention is formed, for example, from zinc (divalent) as a center metal ion and an azo compound bonded with a coupler component having an amino group and a fluorine-substituted alkylsulfonylamino group subjected to condensed ring-formation to have a 1,3,4-thiazole ring as a diazo component.

9 Claims, 2 Drawing Sheets

AZO-METAL CHELATE DYE AND OPTICAL RECORDING MEDIUM

The present invention relates to an azo-metal chelate dye suitable for high-speed recording and to an optical recording medium using this azo-metal chelate dye (in the present invention, an optical recording medium is referred to as "a disc" or "an optical disc" in some cases).

BACKGROUND ART

In recent years, as computers become faster and hard disc capacity increases, volume of data which can be dealt with has increased. In response to this, large-capacity recording media are now in increasing demand and DVD-Rs have therefore been developed as large-capacity recordable optical recording media. Various types of dyes, including cyanine dyes and metal chelate dyes, have been proposed for use in the recording layer of DVD-Rs. A number of optical media have been proposed which use azo-metal chelate dyes that are excellent in light-resistance and weather-resistance among these dyes (See U.S. Pat. No. 6,225,023 and WO00/55136).

DISCLOSURE OF THE INVENTION

Incidentally, along with further increase in data volume, greater importance is given to increase in the speed with which information is recorded on optical recording media. For example, normal recording speed is approximately 3.5 m/s in DVD-Rs (hereinafter, referred to as 1×-speed recording in some cases). However, there are now commercially available optical recording media capable of recording information thereon at a high speed of approximately 28 m/s (hereinafter, referred to as 8×-speed recording in some cases), which corresponds to eight times the speed 1×, but there is further a market demand in future for commercializing a high-speed recording optical recording medium much faster than 10×.

The development of dyes that are particularly suitable for high-speed recording is an issue to be addressed in order to respond to this market demand.

In view of the foregoing issue, it is an object of the present invention to provide an azo-metal chelate dye capable of high-speed recording and an optical recording medium using this azo-metal chelate dye.

SUMMARY OF THE INVENTION

The present inventors have fully studied, and consequently discovered that a specific azo-metal chelate dye is quite suitable as a dye for high-speed recording.

Thus, the first aspect of the present invention resides in an azo-metal chelate dye characterized by being formed from a ligand having active hydrogen in X eliminated from an azo compound of the following formula (I) and a metal ion of IB Group or IIB Group of long-form periodic table, the center metal of which has 10 electrons constituting d orbital of outermost outer shell,

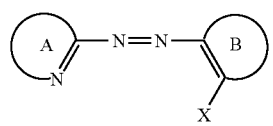

(I)

wherein in the above formula (I), ring A is an aromatic heterocyclic ring which may have a substituent, X is an organic group having active hydrogen, and ring B is a benzene ring which may have a substituent in addition to X or an aromatic heterocyclic ring which may have a substituent in addition to X.

The second aspect of the present invention resides in an azo-metal chelate dye characterized by being formed from a ligand having active hydrogen in X eliminated from an azo compound of the following formula (III) and $Zn^{2+}$ ion,

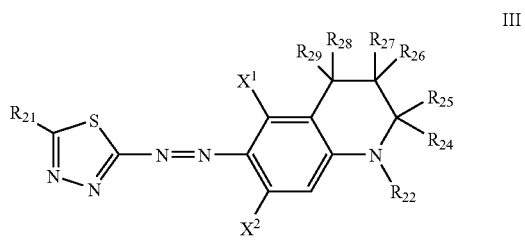

III wherein in the above formula (III), $R_{21}$ is a hydrogen atom, a halogen atom or an ester group expressed by $CO_2R_{23}$ in which $R_{23}$ is a linear or branched alkyl group or a cycloalkyl group; $R_{22}$ is a linear or branched alkyl group which may have a substituent; at least one of $X^1$ and $X^2$ is a $NHSO_2Y$ group in which Y is a linear or branched alkyl group substituted with at least 2 fluorine atoms, and the other is a hydrogen atom; $R_{24}$ and $R_{25}$ are respectively independently a hydrogen atom or a linear or branched alkyl group which may have a substituent; $R_{26}$, $R_{27}$, $R_{28}$ and $R_{29}$ are respectively independently a hydrogen atom or a $C_1$-$C_2$ alkyl group which may have a substituent; and the $NHSO_2Y$ group forms a $NSO_2Y^-$ (negative) group by eliminating $H^+$, and an azo compound of the above formula (III) forms a coordinate bond with a metal ion.

The third aspect of the present invention resides in an optical recording medium for recording and reading with a semiconductor laser light of 300 nm to 700 nm, which has a recording layer containing the above azo-metal chelate dye.

According to the present invention, an azo-metal chelate dye allowing for high-speed recording and an optical recording medium capable of high-speed recording using this azo-metal chelate dye are provided.

BRIEF DESCRIPTION OF THE DRAWINGS

Both FIG. 1(a) shows a graph illustrating measurement results of recording power margin and FIG. 1(b) shows a graph illustrating measurement results of asymmetry margin.

Both FIG. 2(a) shows a graph illustrating measurement results of recording power margin and FIG. 2(b) shows a graph illustrating measurement results of asymmetry margin.

DETAILED DESCRIPTION OF THE INVENTION

Figure 1A:
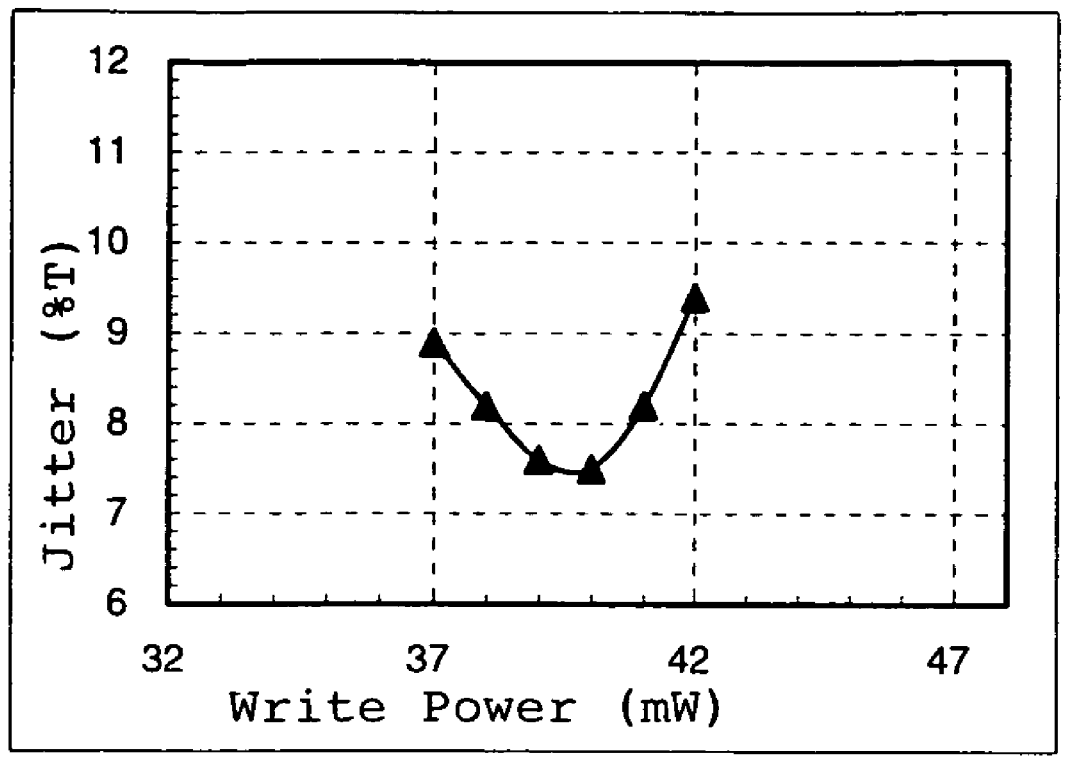
FIGS. 1(a) and 1(b) illustrate recording properties of the optical recording medium of Example 6.

The best mode for carrying out the invention (hereinafter referred to as an embodiment) will be described in detail below. Note that, the present invention is not limited to the following embodiment, and can be implemented with various modifications within the spirit thereof.

The embodiment of the present invention is explained hereinafter in respect that the center metal of the azo-metal chelate dye has 10 electrons constituting the orbital of outermost outer shell, which is a metal ion of IB Group of IIB Group of periodic table.

In the above high-speed recording, the shortest mark must be formed with a pulse of laser light, the radiation time of which is quite short. Thus, in the above high-speed recording, the laser light irradiation time for recording is shorter than 8 ns in order to record a shortest mark length ("3T mark" in the present invention). Therefore, enabling of recording in such a high-speed recording, means to enable such a recording as to make a bottom jitter (a minimum value of jitter value) not exceeding 9% under recording conditions of laser light irradiation time of shorter than 8 ns at the time of recording the shortest mark length, or to enable a commercially available reading (reproducing) apparatus to have such a satisfactory error rate as not to cause substantial problem. It is understandable that the "condition of recording the shortest mark length with such a shortened pulse as to shorter than 8 ns of the irradiation time" is a very severe recording condition when considering that a rise time of a semiconductor laser in the wavelength zone of DVD is about 4 ns.

For example, laser irradiation pulse width for recording 3T mark length used in the following Examples and Comparative Examples were 7.9 ns and 6.5 ns respectively for 10 time speed recording (35 m/s) and 16 time speed recording (56.0 m/s).

The present inventors have intensively studied and found that "a specific azo-metal chelate dye for high speed recording" having a predetermined center metal is a dye suitable for the above-mentioned high speed recording using a shortened pulse. Particularly, it has been found that there is a correlation between a high speed recording performance and a poor light resistance (dye maintenance rate or dye retention rate) of the above-mentioned specific azo-metal chelate dye. This effect is considered to be caused by effectively utilizing an incident light energy for recording by decomposition of the "specific azo-metal chelate dye for high speed recording" of the present invention (optical mode: photon mode).

Thus, in the "specific azo-metal chelate dye for high speed recording", the above optical mode participates in cleavage reaction of bond of the azo-metal chelate dye, and light energy is efficiently used. Consequently, it is considered that there is a possibility of improving recording performance by forming a recording mark having a sharp edge.

Generally, it is known that a reaction speed of optical mode recording is high, and it is possible in principle to finish the reaction in the order of fs (fsec)–ps (psec). If the reaction is finished in this time order, it is quite highly possible that interference does not occur between adjacent marks in view of a rotation speed of a disk. On the other hand, it is generally called as heat mode recording to use an incident light for recording as a heat energy (including decomposition and melting) of a dye. In the heat mode recording, there is a limitation in respect of a reaction speed by heat conductivity. This point is explained hereinafter.

The light resistance or dye retention rate means a light absorbance ratio before and after light resistance test of Wool scale 5 grade of light irradiation conditions of ISO-105-B02 in respect of maximum absorption wavelength of dye mono layer or recording mono layer coating film in the wavelength zone of from 300 to 800 nm, i.e. {(light absorbance after test)/(light absorbance before test)}×100 (%).

In the heat mode recording, there is a limitation in respect of reaction speed by heat conductive speed, and it is considered that in DVD-R, for example, the reaction will be usually finished in the order of ns (nsec). When the reaction is finished in this order, there is a possibility that heat influence is applied to adjacent marks since a rotation speed of disk is the same degree as the order of reaction speed. If the heat influence is applied to adjacent marks, there is a high possibility that heat interference occurs between marks, and jitter becomes poor. However, since this heat mode is irrelevant to light resistance, it is considered that "conventional azo-metal chelate dye" or "light-resistant satisfactory azo-metal chelate dye" causes decomposition mainly by this mode, and recording is effected.

Also, it is considered that radiationless transition represented by vibration relaxation participates in this heat mode.

Accordingly, the "specific azo-metal chelate dye for high-speed recording" of the present invention is considered to be an azo-metal chelate dye having less possibility of causing "radiationless transition" from (1) light-excited state.

It is presumed that excitation transfer of from ligand excited level to low lying d-d excited states or excitation transfer of from ligand excited level to low lying CT (charge transfer) states participates in radiationless transition of many azo-metal chelate dyes. Also, ligand excited level includes ligand excited level localized in a ligand or ligand excited level of large ligand contribution.

When being coordinated to a center metal ion of IIB Group or the like as in the present invention in respect to many azo-metal chelate dyes, it is considered that d-d excited states correspond to an energy level higher than conventional one, and consequently, it is considered that radiationless transition is restricted because excitation transfer of from excited state due to large ligand contribution to low lying excited states such as d-d excited states hardly occurs.

Also, it is considered that the "specific azo-metal chelate dye for high-speed recording" of achieving the object of the present invention is a metal chelate dye having a tendency of eliminating (2) center metal from coordinate bond by light, i.e. a metal chelate dye having a tendency of weak coordinate bond.

For example, in such a case having no vacant d orbital on the outermost outer shell d orbital, in which the center metal ion should participate in coordinate bond, as a zinc (bivalent ion) or copper (monovalent ion), i.e. in a case that d orbital of outermost outer shell occupies 10 electrons (in the present invention, for example, $Zn^{2+}$ constitutes $3d^{10}$ electron configuration since two electrons are taken from electron configuration $3d^{10}4s^2$ of Zn (by ionization)), covalent bonding force of metal-ligand becomes weak. Further, electron is excited in the ligand by light excitation, and a center metal tends to be easily eliminated, namely, the coordinate bond tends to be weak. As this result, there is a case that an absorption band is shifted to the shorter wavelength side and optical constant varies.

Also, when a ligand free from coordinate bond is poor in light resistance, there is a higher tendency that the ligand is reacted by optical mode. Thus, it is considered that the decomposition reaction of such an azo-metal chelate dye has a tendency of optical mode recording of type (1).

Also, it is preferable that a ligand has a molecular orbital having tendency of causing MLCT (metal-to-ligand charge transfer transition) (for example, a ligand has vacant antibonding $\pi$ orbital).

Further, the nature of having a weak covalent bonding property between a ligand and a center metal ion i.e. a weak coordinate bond, is connected with the fact that structure preference energy is in the vicinity of 0 in case where the center metal ion has $d^{10}$ electron configuration ($d^{10}$ configuration).

Thus, the azo-metal chelate dye of the present invention has two azo compounds in one molecule, which become a ligand. One of the ligands is coordinated to one center metal at 3-positions of a nitrogen atom (a nitrogen atom contained in ring A) having a non-pair electron capable of being a Lewis base, a diazo group and an organic group (a group contained in ring B) capable of being an anion by eliminating active hydrogen. Such two ligands are coordinated to one molecule of azo-metal chelate dye, and consequently coordination positions are 6 in total, i.e. 6-coordinate azo-metal chelate dye. However, when the number of electrons constituting d orbital of outermost outer shell are 10, $O_h$ (octahedral) structure becomes unstable although 6-coordinate chelate structure is usually considered to be stable. Also, depending on a combination with the structure of a ligand, a metal chelate dye form is not fixed, and may become a special compound. The above-mentioned "structure preference energy" is cited from K. F. Puncell et al., Inorganic Chemistry, 1977, p. 550.

In the present invention, a preferable center metal is zinc (bivalent) ion.

Also, it is possible to monitor to a certain degree that the "specific azo-metal chelate dye for high-speed recording" of the present invention has a high tendency of optical mode (photon mode) as mentioned above, by judging from the fact that a light absorbance ratio of its dye monolayer before and after Wool scale 5 grade test (light resistance test) under light irradiation conditions as defined in ISO-105-B02, is worse in comparison with conventional azo-metal chelate dye.

The above light absorbance ratio before and after Wool scale 5 grade test (light resistance test) under light irradiation conditions as defined in ISO-105-B02 is a value expressed by {(light absorbance after test)/(light absorbance before test)}× 100(%). This light absorbance ratio before and after the light resistance test is called as light resistance or dye maintenance rate.

As explained above, the light resistance of azo-metal chelate dye largely depends on the contribution of center metal ion, but likely varies also depending on a combination with a ligand.

The light resistance (dye retention rate) is preferably at most 20%, more preferably at most 10%, most preferably at most 5%.

The above-mentioned azo-metal chelate dye for high speed recording is an azo-metal chelate dye which comprises being formed from a ligand having active hydrogen in X eliminated from an azo compound of the following formula (I) and a metal ion of IB Group or IIB Group of long-form periodic table, the center metal of which has 10 electrons constituting d orbital of outermost outer shell,

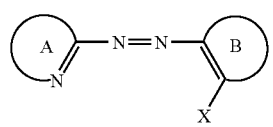
(I)

wherein in the above formula (I), ring A is an aromatic heterocyclic ring which may have a substituent, X is an organic group having active hydrogen, and ring B is a benzene ring which may have a substituent in addition to X or an aromatic heterocyclic ring which may have a substituent in addition to X.

Hereinafter, ring B which is one of the features of the present invention, is explained in more details. The effect of the present invention can be easily achieved when ring B is a benzene ring which may have a substituent in addition to X or an aromatic heterocyclic ring which may have a substituent in addition to X.

The aromatic heterocyclic ring used as ring B is not specially limited. Examples of ring B include a benzene ring, a pyridine ring, a quinoline ring and the like. Among them, a benzene ring is preferable. Also, examples of the substituent include an amino group, an alkyl group, an alkoxy group, a halogen atom or the like. Among them, an amino group is preferable.

More particularly, it is preferable that ring B is a coupler component comprising such a benzene ring as illustrated below.

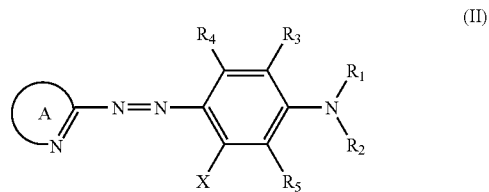
(II)

(In the above formula (II), ring A is an aromatic heterocyclic ring which may have a substituent; X is an organic group having active hydrogen; $R_1$ and $R_2$ are respectively independently a hydrogen atom, a linear or branched alkyl group, a cyclic alkyl group, an aralkyl group or an alkenyl group, and $R_1$ and $R_2$ may form a condensed ring with each other or with an adjacent substituent; and $R_3$, $R_4$ and $R_5$ are respectively independently a hydrogen atom, a $C_1$-$C_{12}$ linear or branched alkyl group, a $C_3$-$C_{12}$ cyclic alkyl group, a $C_2$-$C_{12}$ linear or branched alkenyl group, a $C_7$-$C_{18}$ aralkyl group, a $C_1$-$C_{12}$ linear or branched alkoxy group, a $C_1$-$C_{12}$ linear or branched alkylthio group, a monocyclic saturated heterocyclic ring, a halogen atom, a nitro group, a cyano group, a mercapto group, a hydroxy group, a formyl group, an acyl group expressed by —$COR_6$, an amino group expressed by —$NR_7R_8$, an acylamino group expressed by —$NHCOR_9$, a carbamate group expressed by —$NHCOOR_{10}$, a carboxylate group expressed by —$COOR_{11}$, an acyloxy group expressed by —$OCOR_{12}$, a carbamoyl group expressed by —$CONR_{13}R_{14}$, a sulfonyl group expressed by —$SO_2R_{15}$, a sulfinyl group expressed by —$SOR_{16}$, a sulfamoyl group expressed by —$SO_2NR_{17}R_{18}$, a sulfonate group expressed by —$SO_3R_{19}$ or a sulfonamide group expressed by —$NHSO_2R_{20}$, in which $R_6$, $R_9$, $R_{10}$, $R_{11}$, $R_{12}$, $R_{15}$, $R_{16}$, $R_{19}$ and $R_{20}$ are respectively independently a hydrocarbon group or a heterocyclic group, and $R_7$, $R_8$, $R_{13}$, $R_{14}$, $R_{17}$ and $R_{18}$ are respectively independently a hydrogen atom, a hydrocarbon group or a heterocyclic group.)

X represents an organic group having active hydrogen. Examples of X includes sulfonic acid, carboxylic acid, sulfonamide, carboxyamide and the like. These groups respectively may have a substituent. Among them, sulfonamide and carboxyamide are preferable. More preferred ones are a $NHSO_2Y$ group and a $NHCO_2Y$ group (wherein Y is a linear or branched alkyl group substituted with at least two fluorine atoms).

Examples of the above preferable coupler component are illustrated below.

Hereinafter $R_1$ to $R_5$ in the general formula (II) are explained.

In the general formula (II), $R_1$ and $R_2$ are respectively independently a hydrogen atom, a linear or branched alkyl group such as a methyl group, an ethyl group, a n-propyl group, an isopropyl group, a n-butyl group, an isobutyl group, a sec-butyl group or a tert-butyl group; a cyclic alkyl group such as a cyclopropyl group, a cyclopentyl group or a cyclohexyl group; an aralkyl group such as a benzyl group or a phenetyl group; and an alkenyl group such as a vinyl group, a propenyl group or a hexenyl group.

In respect of the structures represented by these $R_1$ and $R_2$, a carbon number of an alkyl chain part is increased or the structures take a form of a condensed ring structure as described below, and λmax is generally shifted to the longer wavelength side, but if the carbon number is increased too much, the effect in respect of wavelength is not so achieved, and on the contrary, an absorption intensity per g is lowered and causes such a problem that its product is not solidified.

Accordingly, $R_1$ and $R_2$ are preferably a $C_1$-$C_{12}$ linear or branched alkyl group, a $C_3$-$C_{12}$ cyclic alkyl group or a $C_7$-$C_{20}$ aralkyl group (these aromatic ring parts may optionally have a substituent), more preferably a $C_1$-$C_8$ linear or branched alkyl group, a $C_3$-$C_8$ cyclic alkyl group or a $C_7$-$C_{12}$ aralkyl group.

Also, one or both of $R_1$ and $R_2$ may form a saturated carbon ring (condensed ring) by bonding with $R_3$ or $R_5$ of adjacent benzene ring, and $R_3$ and $R_5$ respectively independently have a heteroatom such as an oxygen atom, a sulfur atom or a nitrogen atom and may form a saturated heterocyclic ring (condensed ring) by condensing with $R_1$ and $R_2$. Further, $R_1$ and $R_2$ may bond to each other to form a saturated carbon ring structure (condensed ring). At this time, they may form a saturated heterocyclic ring (condensed ring) having one or a plurality of other heteroatoms in addition to carbon atoms. The ring (condensed ring) thus formed is preferably 5- to 7-membered rings, more preferably 5- to 6-membered rings. Further, a ring (condensed ring) formed by bonding $R_1$ and $R_2$ or a ring formed by having $R_1$ and $R_2$ bonded to a benzene ring, may have a substituent bonded.

Examples of the ring (condensed ring) formed by bonding $R_1$ and $R_2$ or the ring formed by having $R_1$ and $R_2$ bonded to a benzene ring, are illustrated below.

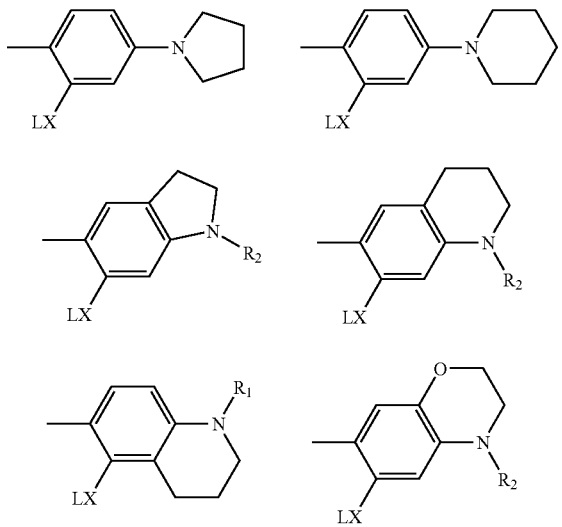

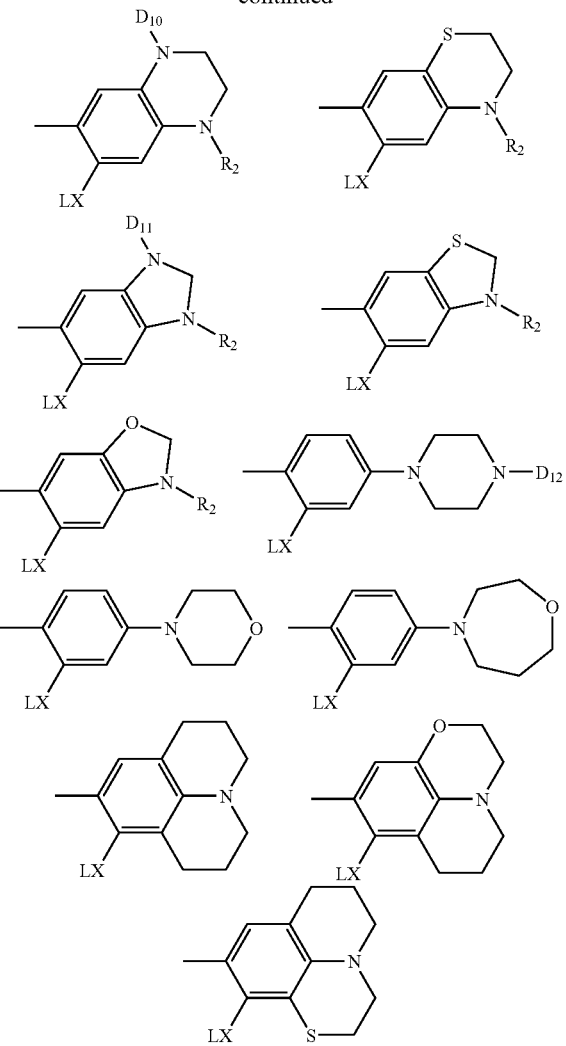

-continued

In the above formulae, $D_{10}$ to $D_{12}$ are a hydrogen atom or an alkyl or acyl group which may have a substituent. Also, an aromatic ring may have an optional substituent, and the number and the position of the substituent are not specially limited so long as they are within the scope of the present invention.

$R_3$, $R_4$ and $R_5$ are a hydrogen atom or a $C_1$-$C_{12}$ linear or branched alkyl group such as a methyl group, an ethyl group, a propyl group, an isopropyl group, a n-butyl group, a sec-butyl group, a tert-butyl group or a n-heptyl group; a $C_3$-$C_{12}$ cyclic alkyl group such as a cyclopropyl group, a cyclopentyl group, a cyclohexyl group or an adamantyl group; a $C_2$-$C_{12}$ linear or branched alkenyl group such as a vinyl group, a propenyl group or a hexenyl group; a $C_7$-$C_{18}$ aralkyl group such as a benzyl group or a phenetyl group; a $C_1$-$C_{12}$ linear or branched alkoxy group such as a methoxy group, an ethoxy group, a n-propoxy group, an isopropoxy group, a n-butoxy group, a sec-butoxy group or a tert-butoxy group; a $C_1$-$C_{12}$ linear or branched alkylthio group such as a methylthio group, an ethylthio group, a n-propylthio group, a n-butylthio group, a sec-butylthio group or a tert-butylthio group; a monocyclic saturated heterocyclic ring group such as a 4-piperidyl group or a morpholino group; a halogen atom such as a fluorine atom, a chlorine atom or a bromine atom; a nitro group; a cyano group; a mercapto group; a hydroxy group; a formyl group; an acyl group expressed by —COR$_6$; an amino group expressed by —NR$_7$R$_8$; an acylamino group expressed by —NHCOR$_9$; a carbamate group expressed by —NH-COOR$_{10}$; a carboxylic acid ester group expressed by —COOR$_{11}$; an acyloxy group expressed by —OCOR$_{12}$; a carbamoyl group expressed by —CONR$_{13}$R$_{14}$ group; a sulfonyl group expressed by —SO$_2$R$_{15}$; a sulfinyl group expressed by —SOR$_{16}$; a sulfamoyl group expressed by —SO$_2$NR$_{17}$R$_{18}$; a sulfonic acid ester group expressed by —SO$_3$R$_{19}$; and a sulfonamide group expressed by —NHSO$_2$R$_{20}$.

R$_6$, R$_9$, R$_{10}$, R$_{11}$, R$_{12}$, R$_{15}$, R$_{16}$, R$_{19}$ and R$_{20}$ are respectively independently a hydrocarbon group or a heterocyclic group, and R$_7$, R$_8$, R$_{13}$, R$_{14}$, R$_{17}$ and R$_{18}$ are respectively independently a hydrogen atom, a hydrocarbon group or a heterocyclic group.

Examples of the hydrocarbon group expressed by R$_6$ to R$_{20}$ are a C$_1$-C$_{18}$ linear or branched alkyl group such as a methyl group, an ethyl group, a propyl group, an isopropyl group, a n-butyl group, a sec-butyl group, a tert-butyl group or a n-heptyl group; a C$_3$-C$_{18}$ cyclic alkyl group such as a cyclopropyl group, a cyclopentyl group, a cyclohexyl group or an adamantyl group; a C$_2$-C$_{18}$ linear or branched alkenyl group such as a vinyl group, a propenyl group or a hexenyl group; a C$_3$-C$_{18}$ cyclic alkenyl group such as a cyclopentenyl group or a cyclohexenyl group; a C$_7$-C$_{20}$ aralkyl group such as a benzyl group or a phenetyl group; and a C$_6$-C$_{18}$ aryl group such as a phenyl group, a tolyl group, a xylyl group or a mesityl group. An alkyl chain part and an aryl group part of these groups may further be substituted with a substituent which may be contained in the following alkyl chain part.

Also, examples of the heterocyclic ring group expressed by R$_6$ to R$_{20}$ include a saturated heterocyclic ring such as a 4-piperidyl group, a morpholino group, a 2-morpholinyl group or a piperadyl group, or an aromatic heterocyclic ring such as a 2-furyl group, a 2-pyridyl group, a 2-thiazolyl group or a 2-quinolyl group. These heterocylcic groups may contain a plurality of heteroatoms, and may further have a substituent, and their bonding positions are optional.

A preferable heterocyclic ring structure is 5- to 6-membered saturated heterocyclic rings, 5- to 6-membered saturated monocyclic rings and an aromatic heterocyclic ring of their two condensed rings.

Examples of an acyl group expressed by —COR$_6$; an amino group expressed by —NR$_7$R$_8$; an acylamino group expressed by —NHCOR$_9$; a carbamate group expressed by —NHCOOR$_{10}$; a carboxylic acid ester group expressed by —COOR$_{11}$; an acyloxy group expressed by —OCOR$_{12}$; a carbamoyl group expressed by —CONR$_{13}$R$_{14}$; a sulfonyl group expressed by —SO$_2$R$_{15}$; a sulfinyl group expressed by —SOR$_{16}$; a sulfamoyl group expressed by —SO$_2$NR$_{17}$R$_{18}$; a sulfonic acid ester group expressed by —SO$_3$R$_{19}$; and a sulfonamide group expressed by —NHSO$_2$R$_{20}$, are illustrated below.

Examples of the acyl group (—COR$_6$) include substituents of the following structures.

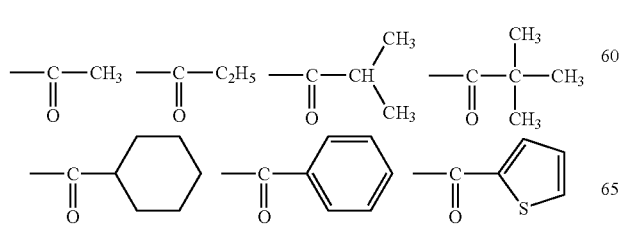

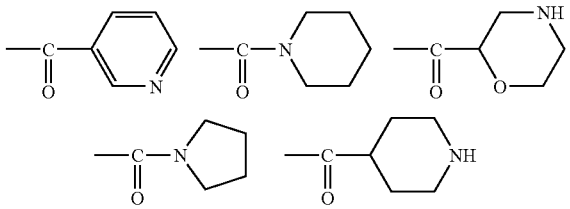

Examples of the amino group (—NR$_7$R$_8$) include substituents of the following structures.

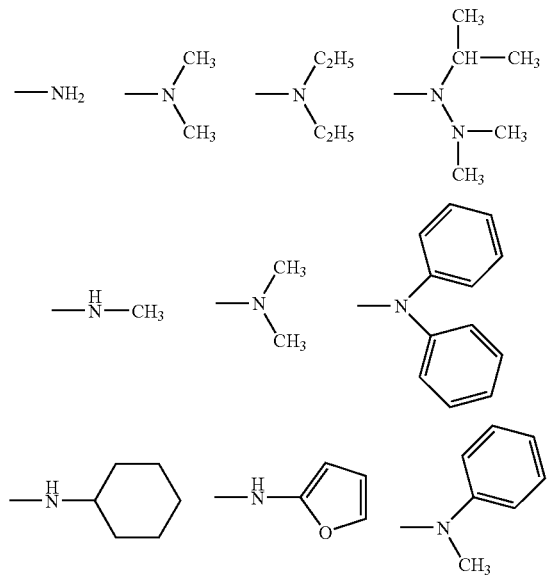

Examples of the acylamino group (—NHCOR$_9$) include substituents of the following structures.

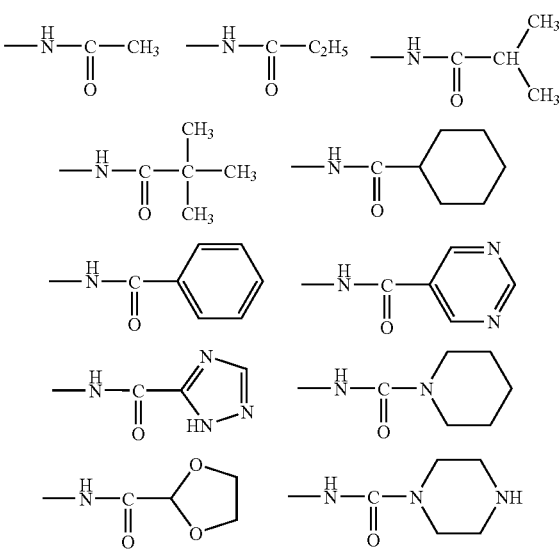

Examples of the carbamate group (—NHCOOR$_{10}$) include substituents of the following structures.

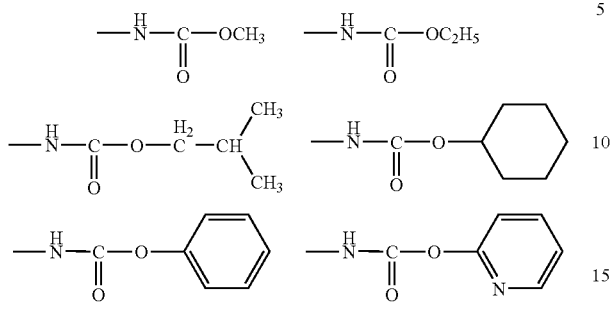

Examples of the carboxylic acid ester group (—COOR$_{11}$) include substituents of the following structures.

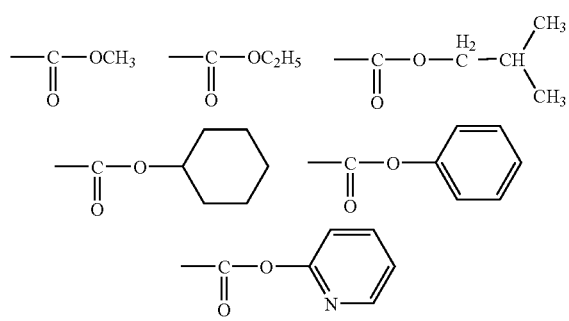

Examples of the acyloxy group (—OCOR$_{12}$) include substituents of the following structures.

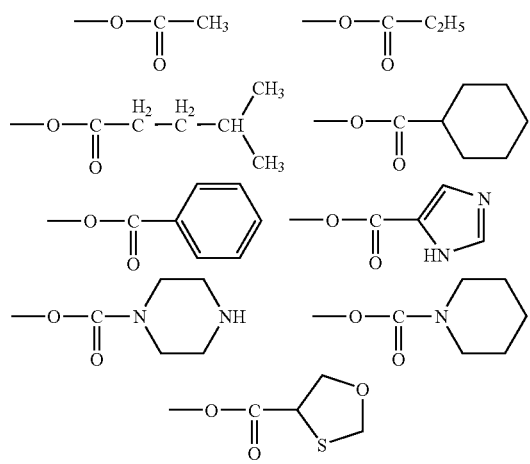

Examples of the carbamoyl group (—CONR$_{13}$R$_{14}$) include substituents of the following structures.

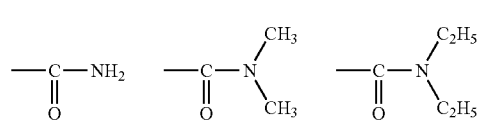

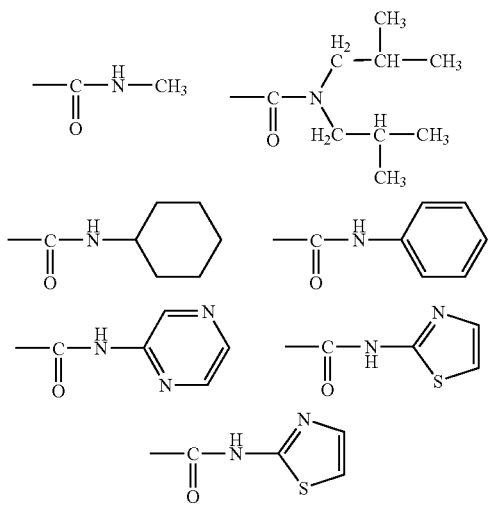

Examples of the sulfonyl group (—SO$_2$R$_{15}$) include substituents of the following structures.

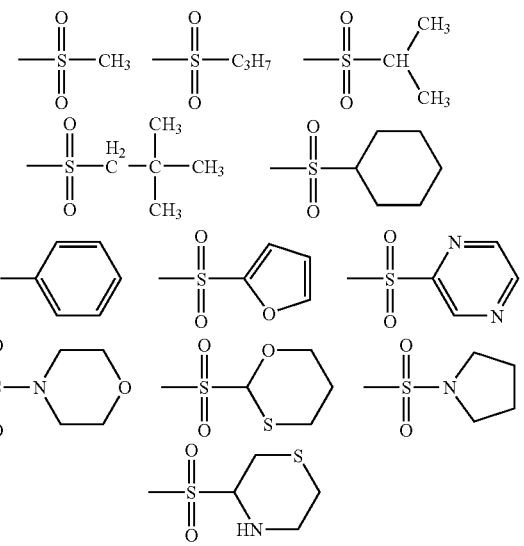

Examples of the sulfinyl group (—SOR$_{16}$) include substituents of the following structures.

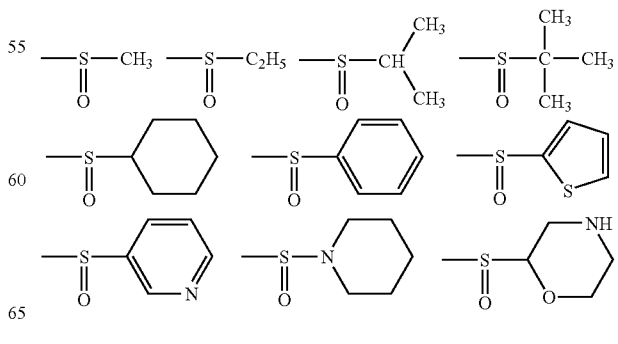

Examples of the sulfamoyl group ($-SO_2NR_{17}R_{18}$) include substituents of the following structures.

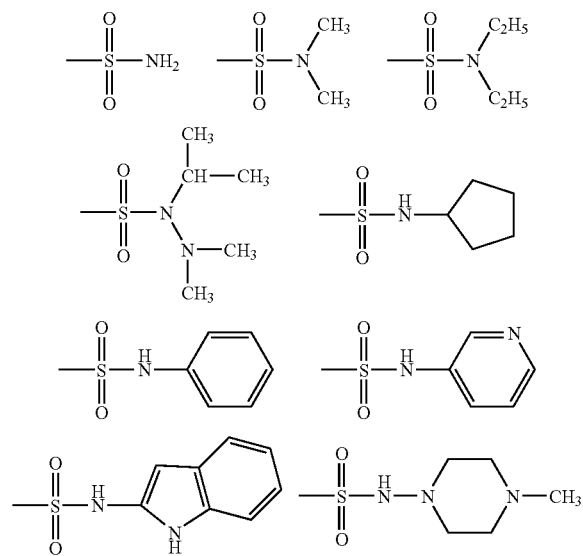

Examples of the sulfonic acid ester group ($-SO_3R_{19}$) include substituents of the following structures.

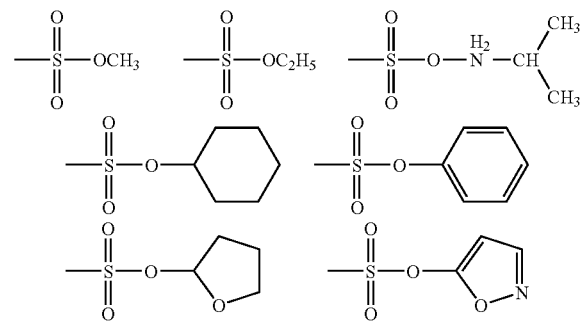

Examples of the sulfonamide group ($-NHSO_2R_{20}$) include substituents of the following structures.

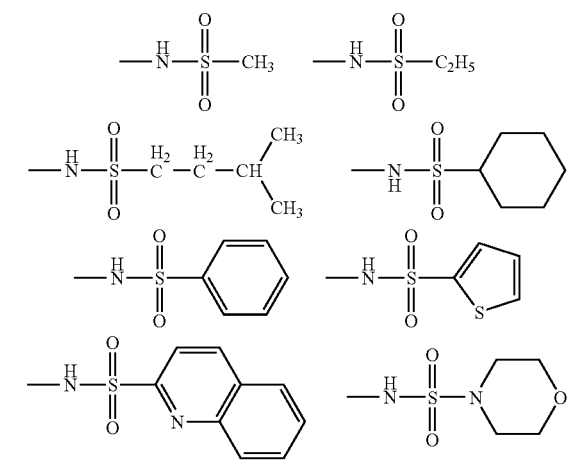

-continued

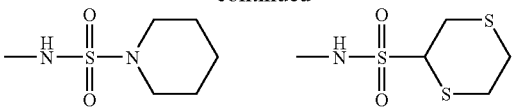

Preferable examples of $R_3$, $R_4$ and $R_5$ include a hydrogen atom or a $C_1$-$C_8$ linear or branched alkyl group, $C_7$-$C_{12}$ aralkyl group, a $C_1$-$C_8$ linear or branched alkoxy group, a $C_1$-$C_8$ linear or branched alkylthio group, a monocyclic 5- or 6-membered saturated heterocyclic group, a halogen atom, a nitro group, a cyano group, a mercapto group, a hydroxy group, an acyl group expressed by $-COR_6$, an amino group expressed by $-NR_7R_8$, an acylamino group expressed by $-NHCOR_9$, a carbamate group expressed by $-NH-COOR_{10}$, a carboxylic acid ester expressed by $-COOR_{11}$, an acyloxy group expressed by $-OCOR_{12}$, a carbamoyl group expressed by $-CONR_{13}R_{14}$, a sulfonyl group expressed by $-SO_2R_{15}$, a sulfamoyl group expressed by $-SO_2NR_{17}R_{18}$, and a sulfonamide group expressed by $-NHSO_2R_{20}$.

Hereinafter, ring A is explained in more details.

Ring A is preferably any one of a thiadiazole ring, an isoxazole ring, an imidazole ring, a thiazole ring, a triazole ring, a pyridine ring, and a pyrimidine ring, which may have a substituent. By electing these rings, solubility to an organic solvent becomes satisfactory and there is a tendency that a satisfactory light absorbance can be secured.

Among them, more preferable examples of ring A include any one of a thiadiazole ring, an isoxazole ring and an imidazole ring. The above azo-metal chelate dye having a thiadiazole ring or an imidazole ring is more preferable because there is a tendency that a satisfactory light absorbance can be easily secured.

Also, the above azo-metal chelate dye having a thiadiazole ring or an imidazole ring is more preferable because there is a possibility that its coated film can provide a larger refractive index. The above azo-metal chelate dye having an isoxazole ring is more preferable because it is considered that there is a tendency of providing a remarkable decomposition performance of the above optical mode by combining with a center metal of the present invention. The thiadiazole ring means both of a 1,3,4-thiadiazole ring and a 1,2,4-thiadiazole ring.

Further, the most preferable example of the "specific azo-metal chelate dye for high-speed recording" of the present invention includes a case where a ring A is a thiadiazole ring. Hereinafter, a ligand (azo compound) using the azo-metal chelate dye is explained concretely by using the following formula (III).

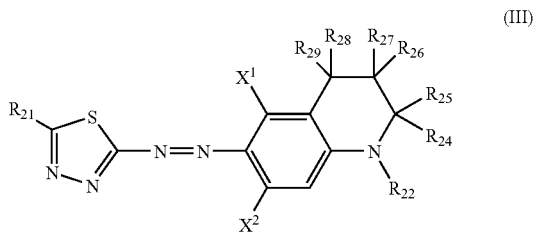

(In the above formula (III), $R_{21}$ is a hydrogen atom, a halogen atom or an ester group expressed by $CO_2R_{23}$ in which $R_{23}$ is a linear or branched alkyl group or a cycloalkyl group; $R_{22}$ is a linear or branched alkyl group which may have a substituent; at least one of $X^1$ and $X^2$ is a $NHSO_2Y$ group in which Y is a linear or branched alkyl group substituted with at least 2 fluorine atoms, and the other is a hydrogen atom; $R_{24}$ and $R_{25}$ are respectively independently a hydrogen atom or a linear or branched alkyl group which may have a substituent; $R_{26}$, $R_{27}$, $R_{28}$ and $R_{29}$ are respectively independently a hydrogen atom or a $C_1$-$C_2$ alkyl group which may have a substituent; and the $NHSO_2Y$ group forms a $NSO_2Y^-$ (negative) group by eliminating $H^+$, and an azo compound of the above formula (III) forms a coordinate bond with a metal ion.)

Substituent $R_{21}$ in the diazo component is a hydrogen atom, a halogen atom or an ester group expressed by $CO_2R_{23}$, and $R_{23}$ is a linear or branched alkyl group which may have a substituent or a cycloalkyl group which may have a substituent. The substituent of $R_{23}$ is a halogen atom and further typical elements such as oxygen, nitrogen or sulfur, and is not specially limited. Preferable examples of $R_{23}$ include a linear or branched alkyl group which is not substituted, a cycloalkyl group which is not substituted, a linear or branched alkyl group which is substituted with fluorine and a linear or branched alkyl group which is substituted with an alkoxy group. Particularly preferable examples of $R_{23}$ include a hydrogen atom; a $C_1$-$C_4$ linear or branched alkyl group such as an ethyl group, a propyl group, an isopropyl group, a butyl group, an isobutyl group, a t-butyl group or a sec-butyl group; and a $C_3$-$C_8$ cycloalkyl group such as a cyclopropyl group, a cyclobutyl group, a cyclopentyl group, a cyclohexyl group or a cycloheptyl group. More particularly preferable examples include a $C_1$-$C_2$ linear alkyl group such as a methyl group or an ethyl group; and a $C_3$-$C_6$ cycloalkyl group such as a cyclopentyl group or a cyclohexyl group, because there steric hindrance is small.

Substituent $R_{21}$ in the diazo component is most preferably a hydrogen atom or a halogen atom such as a chlorine atom or a bromine atom, the steric hindrance of which is smallest, because they provide satisfactory light absorbance or refractive index required in the embodiment of the present invention.

Also, at least one of $X^1$ and $X^2$ in a coupler component is $NHSO_2Y$. In this case, either $X^1$ or $X^2$ is $NHSO_2Y$, and it is more preferable that $X^1$ is $NHSO_2Y$. When $X^1$ is $NHSO_2Y$, $X^2$ is not specially limited, or when $X^2$ is $NHSO_2Y$, $X^1$ is not specially limited, but the other $X^1$ or $X^2$ is preferably a hydrogen atom in view of easiness of synthesis.

Y is a linear or branched alkyl group substituted with at least 2 fluorine atoms. The alkyl group is preferably a $C_1$-$C_6$ linear or branched alkyl group. Y is more preferably a $C_1$-$C_3$ linear alkyl group. The number of a fluorine atom as a substituent is usually at least 2 and usually at most 7, preferably at most 5, more preferably at most 3. Concrete examples of Y include a difluoromethyl group, a trifluoromethyl group, a pentafluoroethyl group, a pentafluoropropyl group, a 2,2,2-trifluoroethyl group and a 3,3,3-trifluoropropyl group. Particularly preferable examples of Y include a trifluoromethyl group and a 2,2,2-trifluoroethyl group.

$R_{24}$ and $R_{25}$ are respectively independently a hydrogen atom or a linear or branched alkyl group which may be substituted. Examples of $R_{24}$ and $R_{25}$ include a hydrogen atom; a $C_1$-$C_6$ linear alkyl group such as a methyl group, an ethyl group, a n-propyl group, a n-butyl group, a n-pentyl group or a n-hexyl group; a $C_3$-$C_8$ branched alkyl group such as an isopropyl group, a sec-butyl group, an isobutyl group, a t-butyl group, a 2-ethylhexyl group, a cyclopropyl group or a cyclohexylmethyl group; a halogen atom such as fluorine, chlorine, bromine or iodine; a $C_1$-$C_8$ alkoxy group such as a methoxy group, an ethoxy group, a n-propoxy group, an isopropoxy group, a n-butoxy group, an isobutoxy group, a sec-butoxy group, a t-butoxy group, a n-pentyloxy group, a cyclopropyloxy group, a cyclohexylmethyloxy group or a 2-ethylhexyloxy group; a $C_2$-$C_9$ alkoxycarbonyl group such as a methoxycarbonyl group, an ethoxycarbonyl group, a n-propoxycarbonyl group, an isopropoxycarbonyl group, a n-butoxycarbonyl group, an isobutoxycarbonyl group, a sec-butoxycarbonyl group, a t-butoxycarbonyl group, a n-pentyloxycarbonyl group, a cyclopropyloxycarbonyl group, a cyclohexylmethoxycarbonyl group or a 2-ethylhexyloxycarbonyl group; a $C_2$-$C_9$ alkylcarbonyloxy group such as a methylcarbonyloxy group, an ethylcarbonyloxy group, a n-propylcarbonyloxy group, an isopropylcarbonyloxy group, a n-butylcarbonyloxy group, an isobutylcarbonyloxy group, a sec-butylcarbonyloxy group, a t-butylcarbonyloxy group, a n-pentylcarbonyloxy group, a cyclopropylcarbonyloxy group, a cyclohexylmethylcarbonyloxy group or a 2-ethylhexylcarbonyloxy group; a $C_2$-$C_9$ alkylcarbonyl group such as an acetyl group, a propionyl group, a butyryl group, an isobutyryl group, a valeryl group, an isovaleryl group, a 2-methylbutyryl group, a pivaloyl group, a hexanoyl group, a cyclopropylcarbonyl group, a cyclohexylmethylcarbonyl group or a 2-ethylhexylcarbonyl group; a $C_2$-$C_{16}$ dialkylamino group such as a dimethylamino group, a diethylamino group, a dipropylamino group, a diisopropylamino group, a dibutylamino group, a diisobutylamino group, a di-t-butylamino group, a dihexylamino group, an ethylmethylamino group or a butylpentylamino group.

A linear or branched alkyl or alkoxy group may further be substituted with a substituent illustrated with regard to $R_{24}$ and $R_{25}$. Among $R_{24}$ and $R_{25}$, preferable examples include a hydrogen atom, a $C_1$-$C_6$ linear alkyl group, and a $C_1$-$C_8$ alkoxy group. More preferable examples of $R_{24}$ and $R_{25}$ include a hydrogen atom, a $C_1$-$C_2$ alkyl group or a $C_1$-$C_2$ alkoxy group. The above alkyl group and alkoxy group are preferably unsubstituted. Particularly preferable examples of $R_{24}$ and $R_{25}$ include a hydrogen atom, a methyl group, an ethyl group and a methoxy group.

$R_{22}$ is a linear or branched alkyl group which may be substituted. Examples of $R_{22}$ include a $C_1$-$C_6$ linear alkyl group such as a methyl group, an ethyl group, a propyl group, a butyl group, a pentyl group or a hexyl group; and a $C_3$-$C_8$ branched alkyl group such as an isopropyl group, a sec-butyl group, an isobutyl group, a t-butyl group, a 2-ethylhexyl group, a cyclopropyl group or a cyclohexylmethyl group.

These alkyl groups may be substituted. Examples of the substituent include a halogen atom such as fluorine, chlorine, bromine or iodine; a $C_1$-$C_8$ alkoxy group such as a methoxy group, an ethoxy group, a n-propoxy group, an isopropoxy group, a n-butoxy group, an isobutoxy group, a sec-butoxy group, a t-butoxy group, a n-pentyloxy group, a cyclopropyloxy group, a cyclohexylmethyloxy group or a 2-ethylhexyloxy group; a $C_2$-$C_9$ alkoxycarbonyl group such as a methoxycarbonyl group, an ethoxycarbonyl group, a n-propoxycarbonyl group, an isopropoxycarbonyl group, a n-butoxycarbonyl group, an isobutoxycarbonyl group, a sec-butoxycarbonyl group, a t-butoxycarbonyl group, a n-pentyloxycarbonyl group, a cyclopropyloxycarbonyl group, a cyclohexylmethoxycarbonyl group or a 2-ethylhexyloxycarbonyl group; a $C_2$-$C_9$ alkylcarbonyloxy group such as a methylcarbonyloxy group, an ethylcarbonyloxy group, a n-propylcarbonyloxy group, an isopropylcarbonyloxy group, a n-butylcarbonyloxy group, an isobutylcarbonyloxy group, a sec-butylcarbonyloxy group, a t-butylcarbonyloxy group, a n-pentylcarbonyloxy group, a cyclopropylcarbonyloxy group, a cyclohexylmethylcarbonyloxy group or a 2-ethylhexylcarbonyloxy group; a $C_2$-$C_9$ alkylcarbonyl group such as an acetyl group, a propionyl group, a butyryl group, an isobutyryl group, a valeryl group, an isovaleryl group, a 2-methylbutyryl group, a pivaloyl group, a hexanoyl group, a cyclopropylcarbonyl group, a cyclohexylmethylcarbonyl group or a 2-ethylhexylcarbonyl group; and a $C_2$-$C_{16}$ dialkylamino group such as a dimethylamino group, a diethylamino group, a dipropylamino group, a diisopropylamino group, a dibutylamino group, a diisobutylamino group, a di-t-butylamino group, a dihexylamino group, an ethylmethylamino group or a butylpentylamino group.

Among them, $R_{22}$ is preferably a $C_1$-$C_6$ linear alkyl group which is not substituted or a $C_3$-$C_8$ branched alkyl group which is not substituted. When the unsubstituted linear alkyl group is used, its carbon number is usually at least 1 and at most 6. The carbon number is preferably at most 5, more preferably at most 4. On the other hand, when the unsubstituted branched alkyl group is used, its carbon number is usually at least 3 and at most 8. The carbon number is preferably at most 7, more preferably at most 6, still more preferably at most 5, particularly preferably at most 4. $R_{21}$ is particularly preferably a methyl group, an ethyl group, a propyl group, an isopropyl group or an isobutyl group.

$R_{26}$, $R_{27}$, $R_{28}$ and $R_{29}$ are respectively independently a hydrogen atom or a $C_1$-$C_2$ alkyl group. it is preferable to use a hydrogen atom or a $C_1$-$C_2$ alkyl group because light absorbance and refractive index easily become predetermined values. In the $C_1$-$C_2$ alkyl group, a hydrogen atom bonded to a carbon atom may be substituted with other substituent (such as a halogen atom), but an unsubstituted alkyl group is preferable. Examples of the $C_1$-$C_2$ alkyl group include a methyl group or an ethyl group. In view of easiness of synthesis and steric structure, $R_{26}$, $R_{27}$, $R_{28}$ and $R_{29}$ are most preferably a hydrogen atom.

Examples of the above-mentioned azo compounds preferable as a ligand are illustrated below.

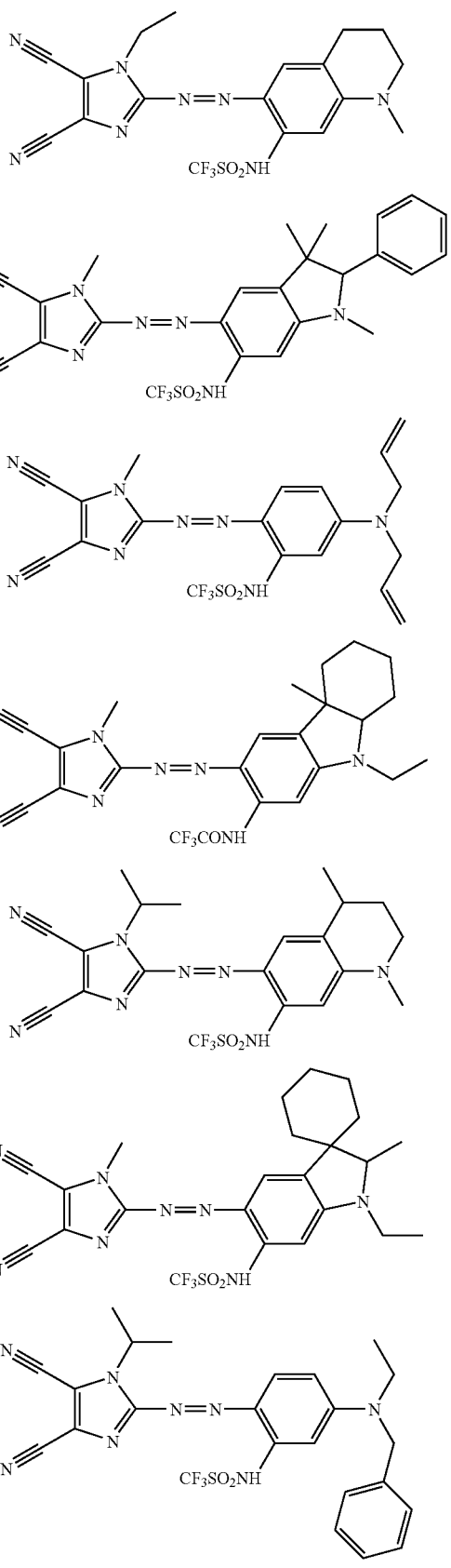

-continued
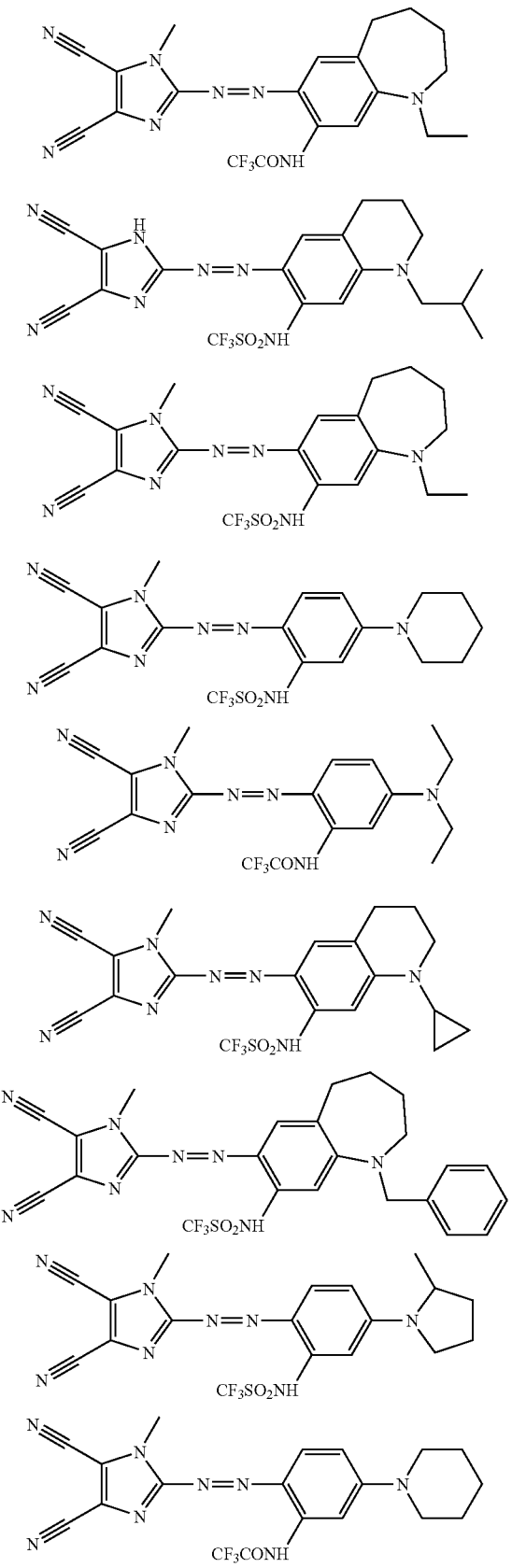
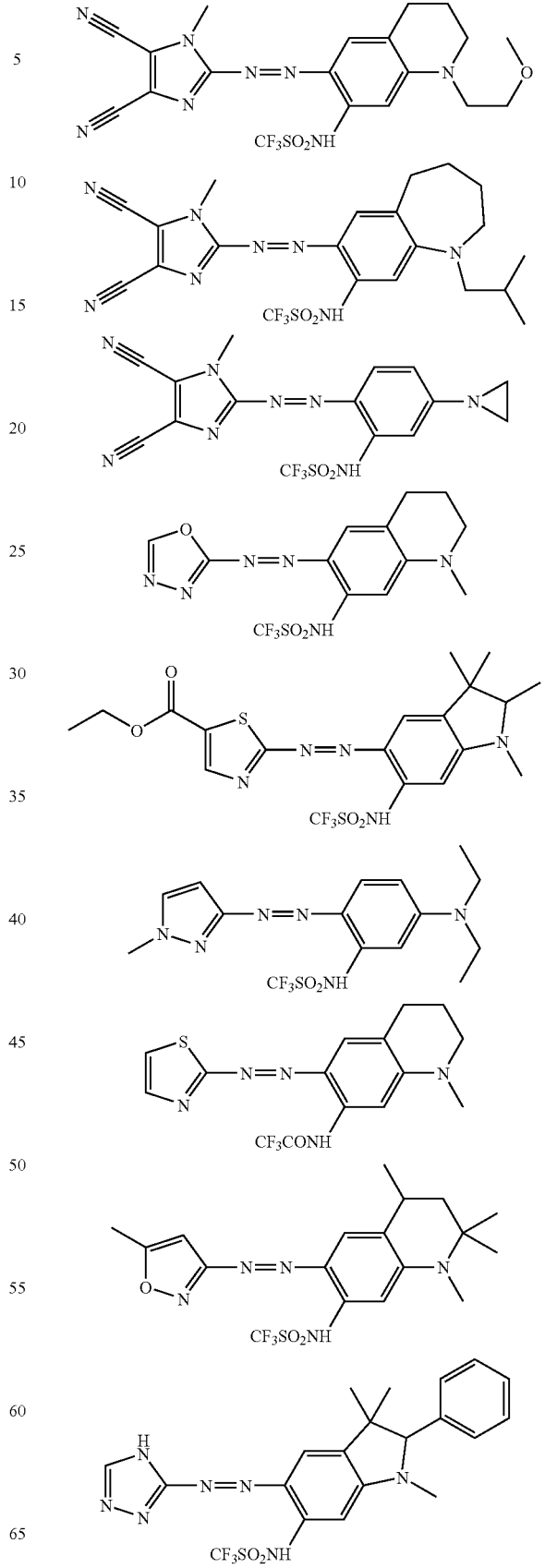

-continued
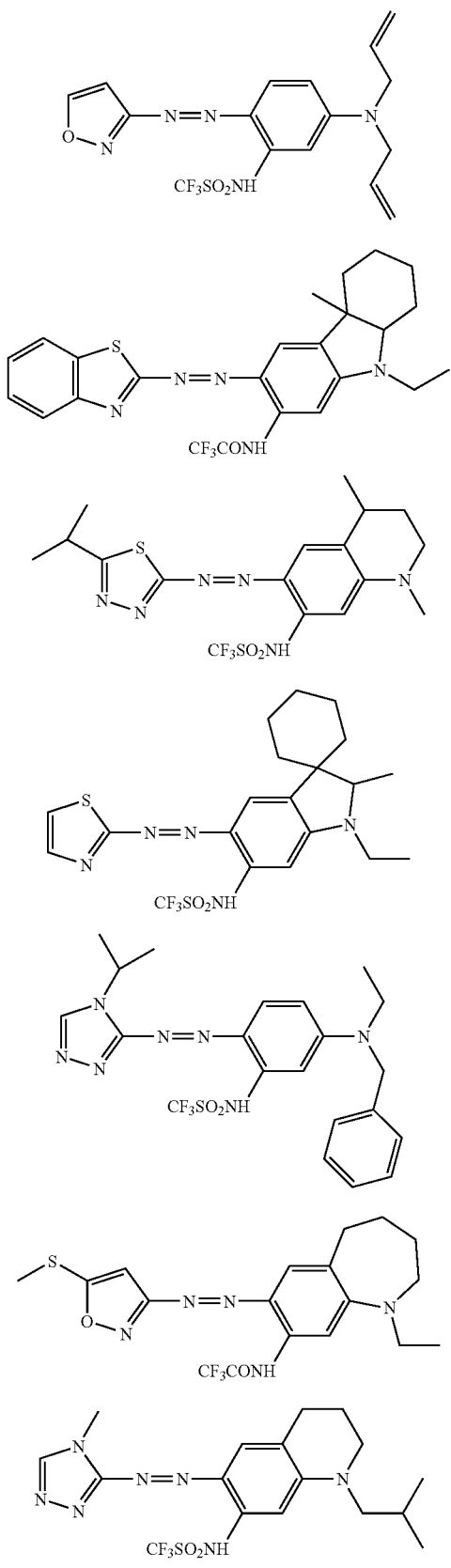
-continued
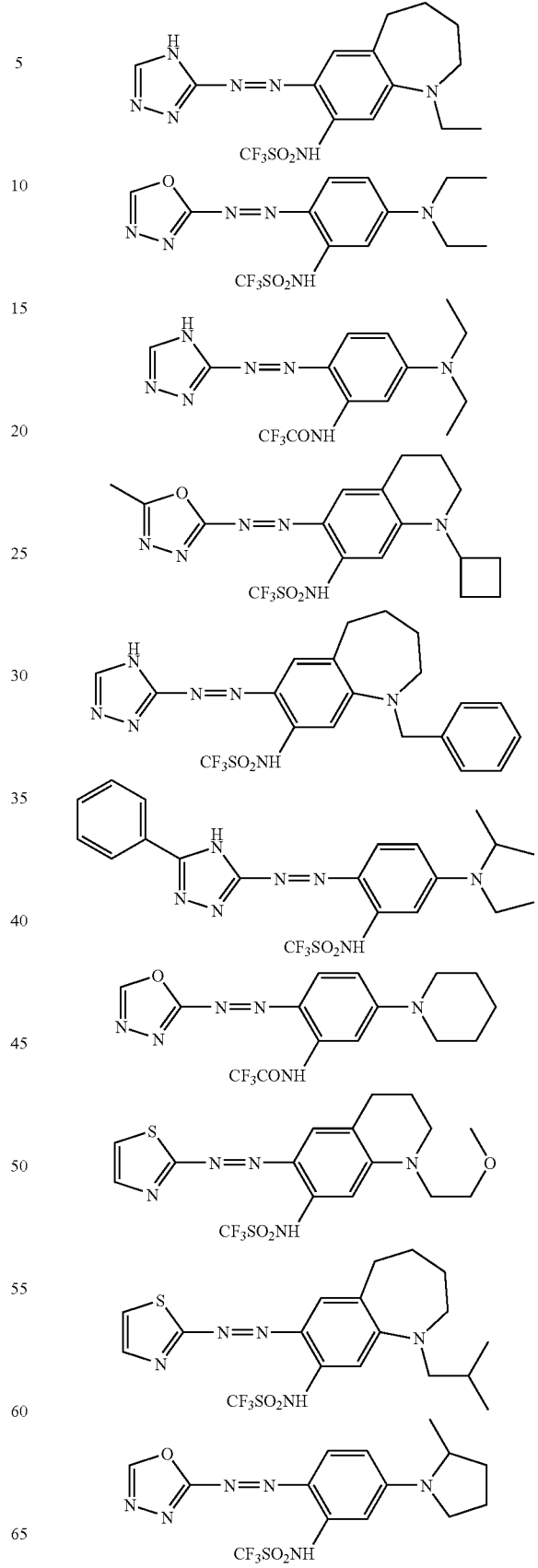

-continued
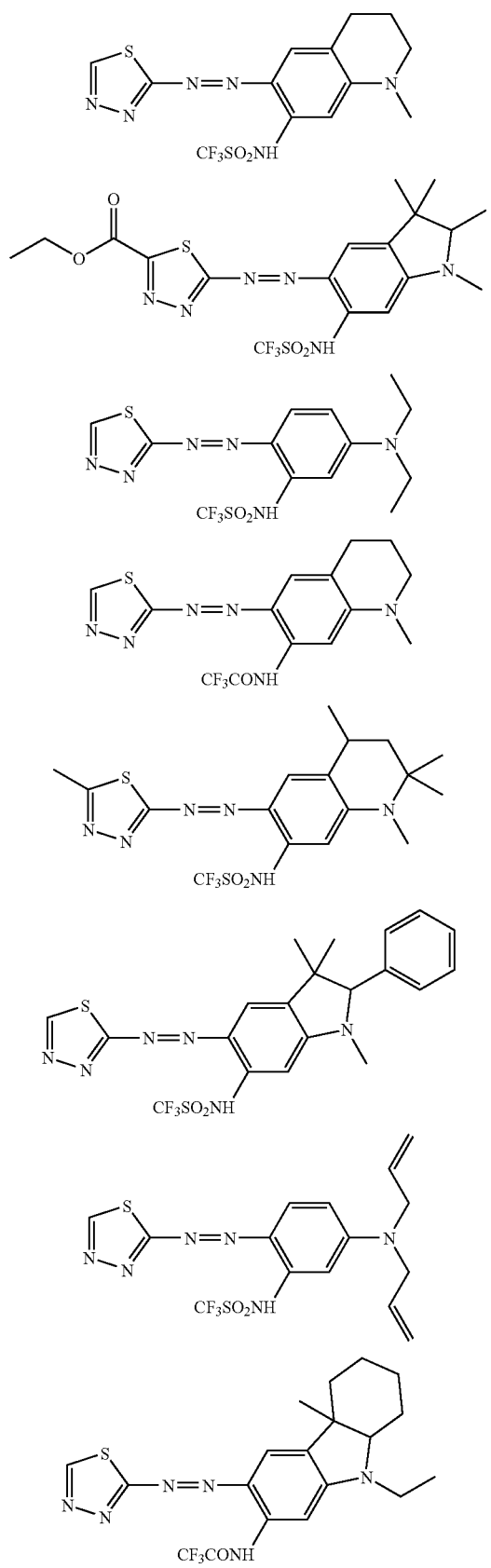
-continued
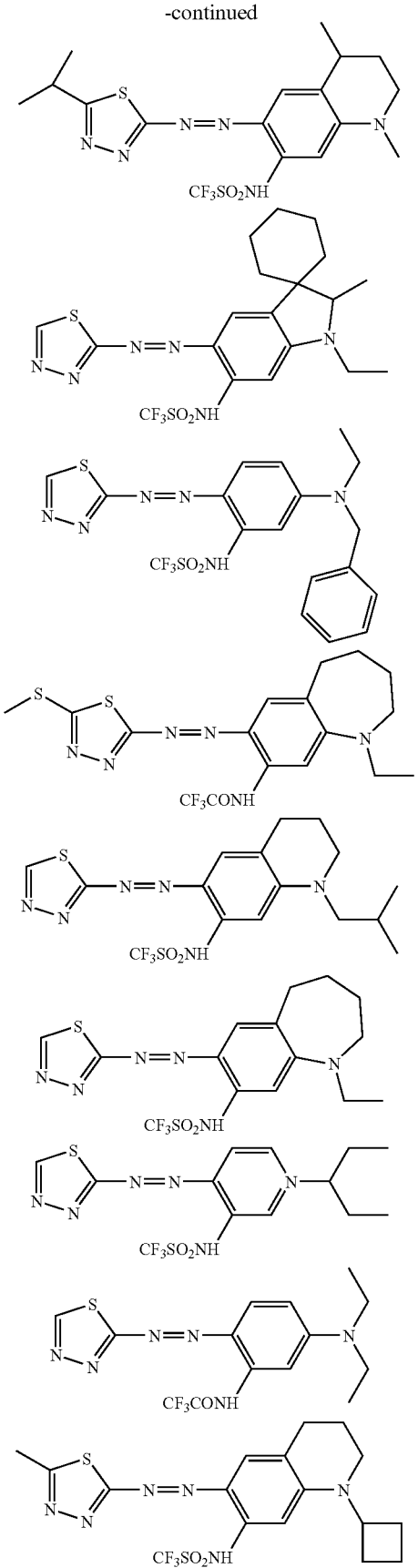

-continued
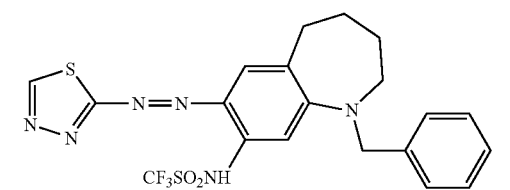
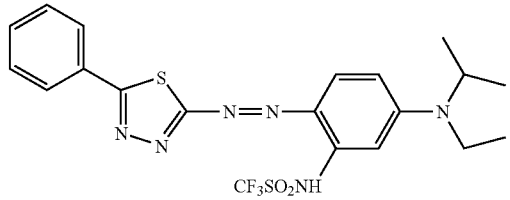
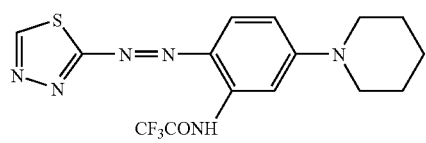
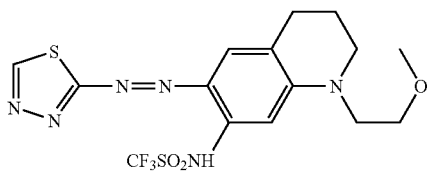
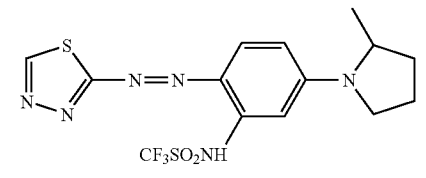
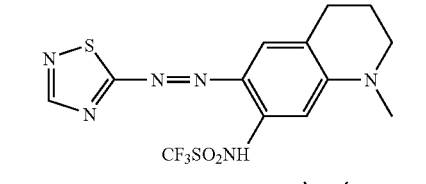
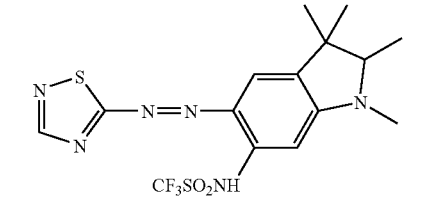
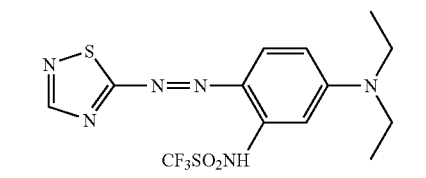
-continued
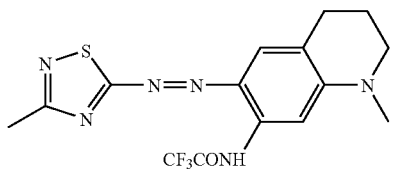
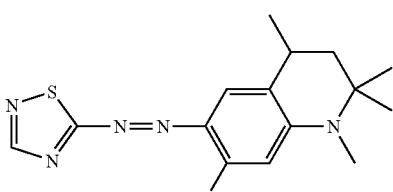
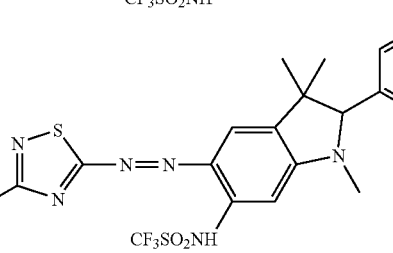
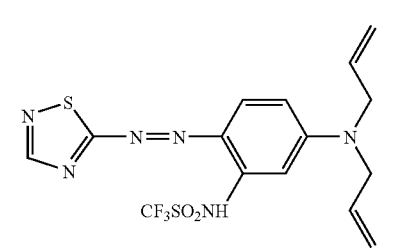
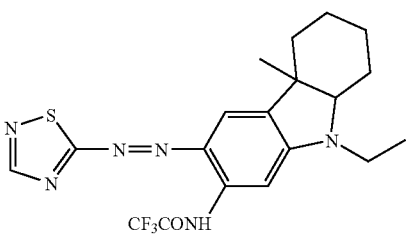
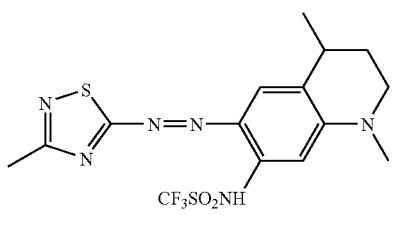
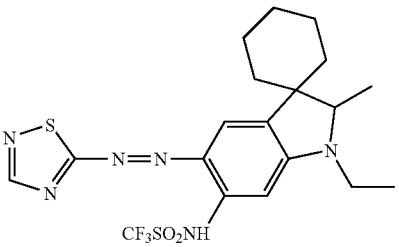

-continued
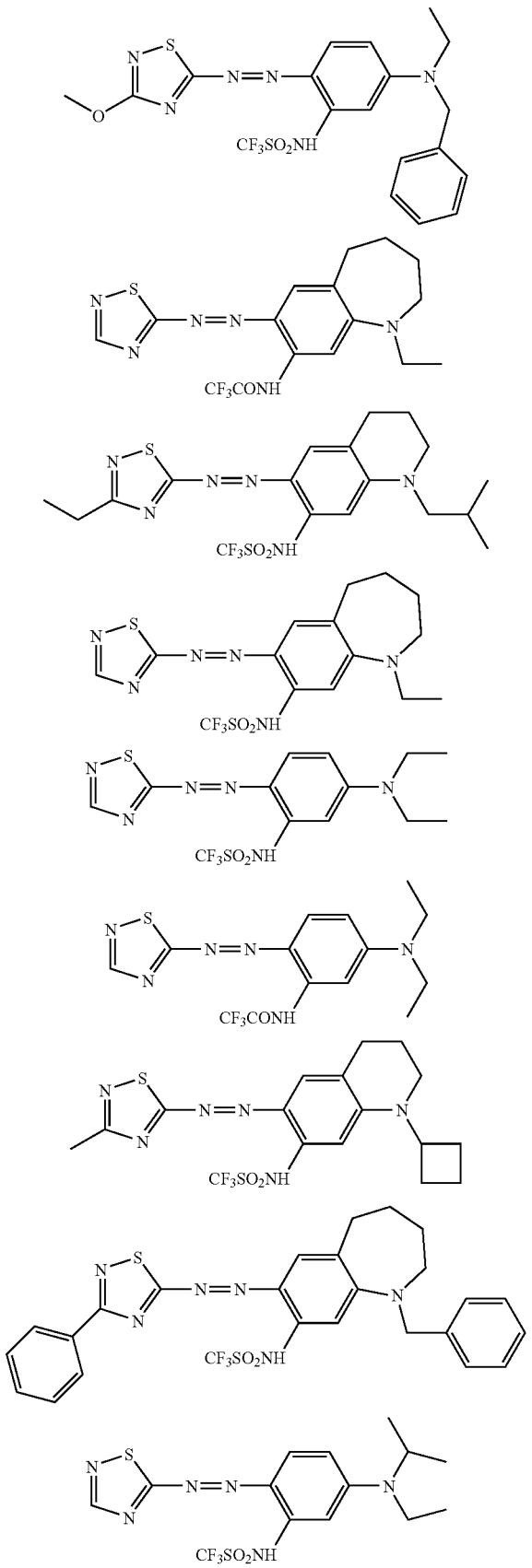
-continued
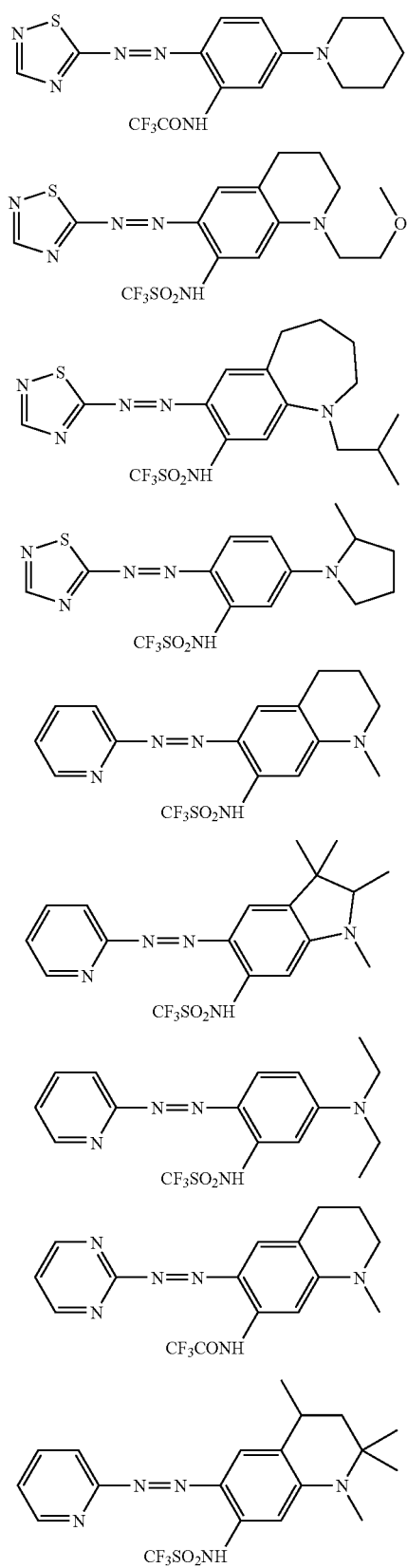

-continued
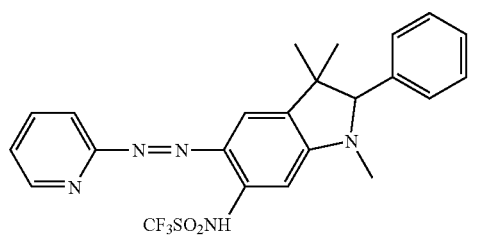
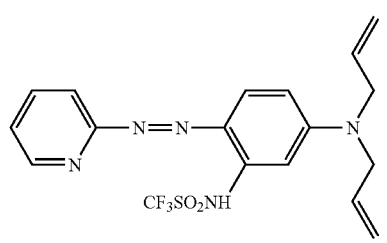
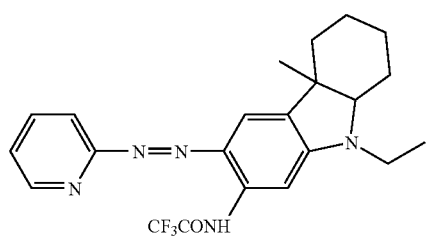
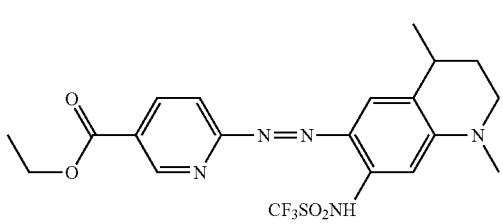
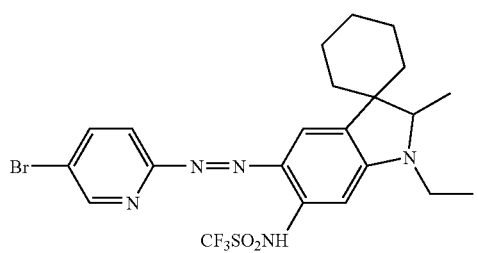
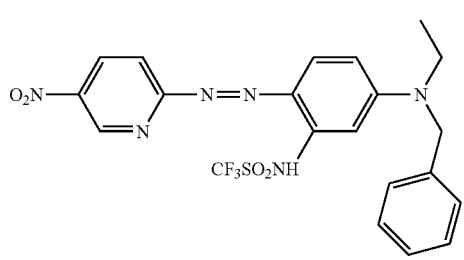
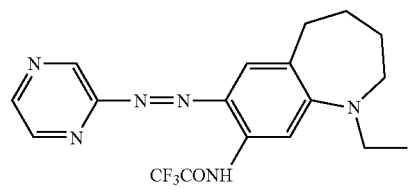
-continued
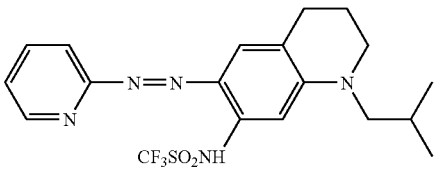
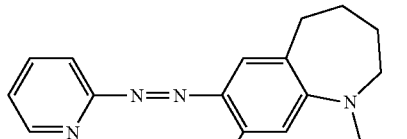
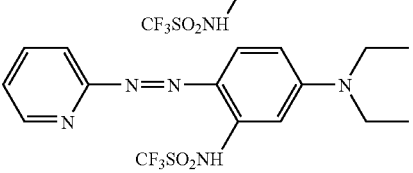
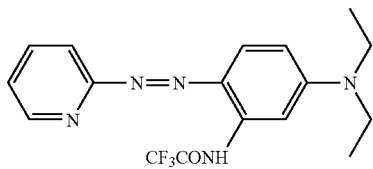
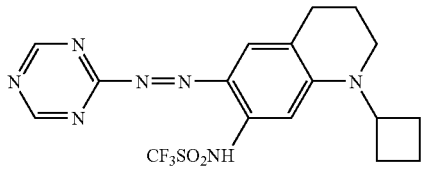
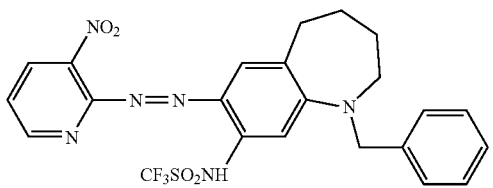
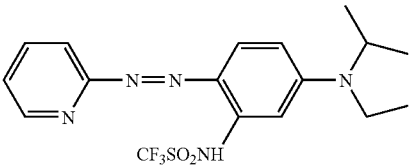
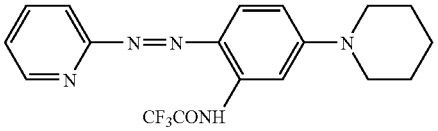
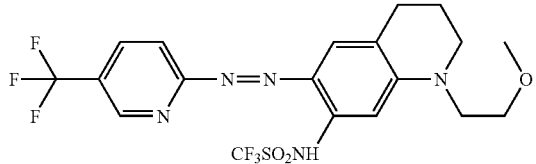
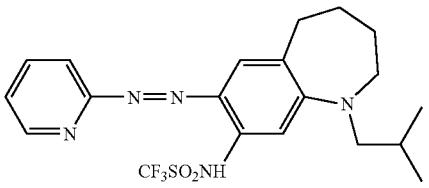

-continued

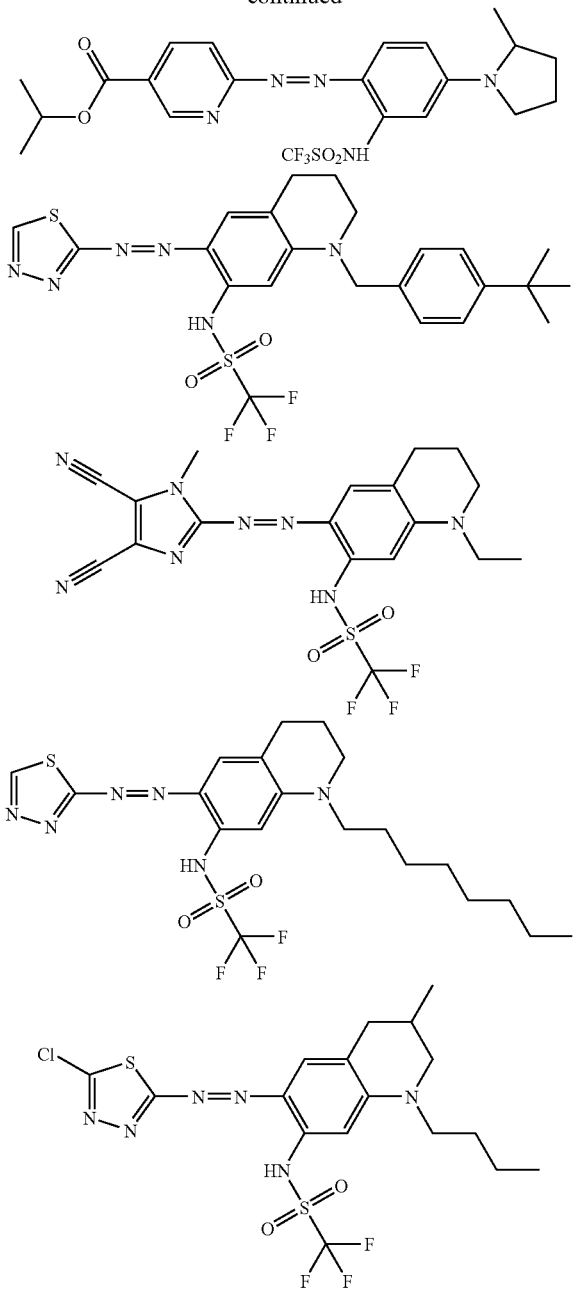

Except for structure, there are no limitations on azo-metal chelate dyes. However, in consideration of applying the azo-metal chelate dyes to optical recording media, which are capable of recording and reading by means of laser light with short wavelengths and are needed in ever-greater numbers in the future, dyes that exhibit the maximum absorption at a wavelength of 700 nm or less are preferable, and dyes that exhibit the maximum absorption at a wavelength ranging from 650 to 500 nm are further preferable, which are measured for a single layer dye film.

Hereinafter, an optical recording medium having in a recording layer an azo-metal chelate dye to which the present embodiment is applied will be described.

The optical recording medium to which the present embodiment is applied has a substrate, and a recording layer including an azo-metal chelate dye formed from a metal ion of IB Group or IIB Group of periodic table, the center metal of which has 10 electrons constituting d orbital of outermost outer shell. Preferably, the optical recording medium of the present embodiment has a substrate, and a recording layer including an azo-metal chelate dye consisting of the azo dye compound represented by the formula (1) and a metal. The optical recording medium may be a layered-structure in which an under coat layer, a metal reflecting layer, a protection layer and the like are provided on a substrate as appropriate. For the preferable example of the layered-structure, for example, an optical recording medium having high reflectivity can be cited in which a recording layer, a metal reflecting layer and a protection layer are provided on a substrate.

Hereinafter, by taking an optical recording medium having such a layered-structure as an example, a description will be given of an optical recording medium to which the present embodiment is applied.

Basically, the material for the substrate of the optical recording medium to which the present embodiment is applied may be one that is transparent to the recording light and reading light. For example, polymer material such as polycarbonate resin, vinyl chloride resin, acrylic resin such as methyl polymethacrylate, polystyrene resin, epoxy resin, vinyl acetate resin, polyester resin, polyethylene resin, polypropylene resin, polyimide resin and amorphous polyolefin, inorganic material such as glass can be used. Polycarbonate resin is preferably used in light of high throughput, cost, resistance to hygroscopicity and the like.

Using injection molding and the like, these materials for a substrate are molded into a disc shape to serve as a substrate. It is to be noted that guide grooves and pits may be formed on the surface of the substrate when needed. It is preferable that these guide grooves and pits be provided at a time when the substrate is molded. However, it is also possible to provide guide grooves and pits on the substrate by use of an ultraviolet curing resin layer. When the guide grooves have spiral shapes, it is preferable that the groove pitch be in a range of around 0.4 to 1.2 μm inclusive, particularly preferably in a range of around 0.6 to 0.9 μm inclusive.

In terms of the atomic force microscope (AFM) measurement value, it is preferable that the groove depth is generally in a range of 100 to 200 nm inclusive. In particular, the groove depth is preferably in a range of around 150 to 180 nm inclusive in order to achieve from 1× recording, meaning low-speed, to 8× recording meaning high-speed. When the groove depth is greater than the lower limit, large modulated amplitude can be obtained even in a low-speed recording, when the groove depth is less than the upper limit, sufficient reflectivity can be easily obtained. The groove width is generally in a range of 0.20 to 0.40 μm inclusive in terms of the atomic force microscope (AFM) measurement value. For high-speed recording application, it is further preferable that the groove width be in a range of 0.28 to 0.33 μm inclusive. When the groove width is greater than the lower limit, sufficient push-pull signal amplitude can be easily obtained. Moreover, deformation of the substrate has a significant influence on the amplitude of the recording signal. For this reason, when recording at speeds higher than 8×, setting the groove width to be greater than the above lower limit will suppresses the influence of thermal interference, facilitating to obtain small jitter. Furthermore, wide recording power margin is provided to give excellent recording characteristics and recording conditions, for example, tolerance to variations in laser power is increased. In the case where the groove width is less than the upper limit, when performing low-speed recording such as 1×, it is possible to suppress thermal interference in recording marks and to obtain excellent jitter value.

The optical recording medium to which the present embodiment is applied can record information, such as address information, information about type of media, condition of recording pulse and optimal recording power. Formats such as LPP and ADIP, which are described in DVD-R and DVD+R standards, may be used to record the information.

In the optical recording medium to which the present embodiment is applied, a recording layer including an azo-metal chelate dye having the above-described specific properties and structure is formed on a substrate, or on an under coat layer and the like which have been provided as required. The recording layer including such an azo-metal chelate dye has high sensitivity, high reflectivity and relatively high decomposition temperature (or the temperature at which the amount begins to decrease in terms of TG-DTA measurement). The recording layer including the above-described azo-metal chelate dye can achieve high-speed recording with single composition.

As the conventional recording layers which have been regarded to have high sensitivity, there are known a recording layer which uses a dye having higher absorption coefficient at the recording light wavelength and a recording layer using a low-temperature decomposition dye which decomposes at temperatures lower than 240° C. However, in the former case, it is difficult to obtain a reflectivity of 40% or more using this dye as a single component. In addition, in the latter case, there have been the following problems: that is, deterioration owing to reading light power; crosstalk that occurs because of the tendency of recording marks to spread; and jitter tends to be large because of thermal interference.

On the other hand, according to the recording layer including the azo-metal chelate dye having the above-described specific properties and structure, it is possible to solve these problems and to achieve high-speed recording. Higher reflectivity is obtained in spite of the fact that the dye used in this recording layer has the absorption peak at longer wavelengths, that is, the dye has a high absorption coefficient at recording and reading wavelengths. It is conceivable that reason for this is due to a high refraction index in the recording layer.

Generally, it is believed that it is preferable for the recording layer of an optical recording medium to have a refraction index at least 2 and at most 3 and an extinction coefficient at least 0.03 and at most 0.1 at the wave-length of (recording and reading light wavelength±3 nm). In order to perform high-speed recording, it is preferable that the refraction index be as high as possible (for example, 2.5 or more). This is preferable because a higher refraction index makes recording modulation amplitude larger, since it is possible to ensure large optical path difference at the same film thickness. The higher the refraction index is, the higher the reflectivity of a disc is, thereby leading to high recording modulation amplitude with thinner film thickness. Use of this recording layer having a high refraction index allows for reduction in the film thickness, which is required for high-speed recording at 8× or more, and is more advantageous for excellent high-speed recording because thermal interference and crosstalk are suppressed.

As methods of forming the recording layer of the optical recording medium to which the present embodiment is applied, thin-film forming methods that are generally performed, such as vacuum deposition method, sputtering method, doctor blade method, casting method, spin coating method and dipping method can be cited. From the viewpoint of mass productivity and cost, spin coating method is particularly preferable.

When spin coating method is used for forming a film, the rotation speed is preferably in a range of 500 to 10000 rpm. In some cases, treatments like annealing or application of vapor of solvent may be performed after spin coating. Application solvents, which are used when application methods such as doctor blade method, casting method, spin coating method and dipping method are employed to form a recording layer, are not particularly limited unless the substrate is damaged. For the application solvent, for example, a ketone alcohol solvent such as diacetone alcohol, 3-hydroxy-3-methyl-2-butanone; a cellosolve solvent such as methylcellosolve and ethylcellosolve; a chain hydrocarbon solvent such as n-hexane and n-octane; a cyclic hydrocarbon solvent such as cyclohexane, methylcyclohexane, ethylcyclohexane, dimethyl cyclohexane, n-butylcyclohexane, t-butylcyclohexane and cyclooctane; a perfluoroalkylalcohol solvent such as tetrafluoropropanol, octafluoropentanol and hexafluorobutanol; a hydroxycarboxylate solvents such as methyl lactate, ethyl lactate and methyl isobutylate; and the like can be cited.

Further, it is possible to obtain a good balance between an optical change and a physical change in a recording part by admixing a conventional azo-metal chelate dye with the "specific azo-metal chelate dye for high-speed recording" of the present invention.

When forming a recording layer, additives such as quencher, ultraviolet absorber, adhesive and the like may be mixed with the above-described dye as appropriate. Alternatively, substituents having various effects such as quenching effect and ultraviolet absorbing effect can be introduced into the above-described dye. As a singlet oxygen quencher to be added to increase light-resistance and durability of the recording layer, metal complexes such as acethylacetonate complex, bisdithiol complex, such as bisdithio-α-diketone complex and bisphenyldithiol complex, thiocatehol complex, salicylaldehydeoxime complex, and thiobisphenolate complex are preferable. In addition, amine compounds are also preferable.

Moreover, in order to improve recording characteristics and the like, other dyes may be used together. In addition, an azo-metal chelate dye to which the present embodiment is applied can be used in combination with a dye used for low-speed recording in order to implement both of high-speed recording and low-speed recording. However, the mixing ratio thereof should be less than 60% with respect to the weight of the azo-metal chelate dye, preferably 50% or less, and further preferably 40% or less. Meanwhile, when the above-described dye for low-speed recording is used together, the mixing ratio is generally set to 0.01% or more. If the mixing ratio of the dye for low-speed recording is excessively high, it is likely that the recording sensitivity required for high-speed recording at 8× or more cannot be obtained.

As dyes which can be used together, azo dye compounds which belong to the same family as those represented by the formula (1) can be cited. Moreover, as dyes that can be used together, azo dyes or azo-metal chelate dyes that belong to the same family as the azo-metal chelate dyes having the above-described specific properties or structures, cyanine dyes, squarylium dyes, naphthoquinone dyes, anthraquinone dyes, porphyrin dyes, tetrapyraporphyrazine dyes, indophenol dyes, pyrylium dyes, thiopyrylium dyes, azulenium dyes, triphenylmethane dyes, xanthene dyes, indanthrene dyes, indigo dyes, thioindigo dyes, merocyanine dyes, bis-pyromethene dyes, thiazin dyes, acridine dyes, oxazine dyes, indoaniline dyes and the like can be cited, and dyes belonging to other families may also be used. As agents that accelerate thermal decomposition of dyes, metallic compounds such as metal anti-knocking agents, metallocene compounds and acetylacetonate metal complex can be cited.

Moreover, binders, leveling agents and antifoaming agents can be used together as needed. As preferable binders, polyvinylalcohol, polyvinylpyrrolidone, nitrocellulose, cellulose acetate, ketone resin, acryl resin, polystylene resin, urethane resin, polyvinylbutyral, polycarbonate and polyolefin can be cited.

The film thickness of the recording layer (dye layer) is not particularly limited. However, it is preferable that the thickness be in a range of 50 to 300 nm inclusive. When the film thickness of the dye layer is greater than the above-described lower limit, the influence of thermo diffusion can be suppressed, and therefore it is facilitated to perform favorable recording. In addition, occurrence of distortion in recording signals is reduced, and therefore it is easy to make the signal amplitude large. When the film thickness of the dye layer is less than the above-described upper limit, it is easy to make the reflectivity higher and to provide excellent reading signal characteristics.

Moreover, the groove-portion film thickness of the recording layer is generally in a range of 90 to 180 nm inclusive, preferably in a range of 50 to 90 nm inclusive. The portion-between-grooves film thickness is generally in a range of 50 to 100 nm inclusive, preferably in a range of 30 to 70 nm inclusive. When the groove-portion film thickness or the portion-between-grooves film thickness is greater than the above-described lower limit, it is possible to secure large amplitude of the address information (LPP and ADIP), thereby making it easy to reduce the occurrence of errors. When the groove-portion film thickness or the portion-between-grooves film thickness is less than the above-described upper limit, it is possible to suppress the influence of heat accumulation in recording marks and to prevent increase in crosstalk, thereby making it easy to provide small jitter.

The optical recording medium to which the present embodiment is applied can exhibit a reflectivity of 40% or more by combining the recording layer including the azo-metal chelate dye having the above-described specific properties or structure and the form of the groove provided on a substrate. Thus, for example, DVD-Rs (in terms of standards, there are two types: DVD-R and DVD+R, which are collectively referred to as DVD-R hereinafter) can be realized that have reading compatibility with DVD-ROMs. Note that, reflectivity means the value measured by using a disc reader (such as a DVD player, DVD-ROM test system and DVD drive) in which laser having wavelength ranging from 650+10 nm to 650-5 nm is mounted on a pickup when grooves on an optical disc are tracked.

Next, a reflecting layer is preferably formed on the recording layer to have a thickness from 50 to 300 nm. For materials used for the reflecting layer, material exhibiting sufficient reflectivity at the reading light-wavelength can be used. For example, metal such as Au, Al, Ag, Ti, Cr, Ni, Pt, Ta and Pd can be separately used. Alternatively, alloy of these metals can also be used. Among these, Au, Al and Ag have high reflectivity and therefore are suited for the material for the reflecting layer. In particular, Ag and Ag alloy have excellent reflectivity and thermal conductivity and are therefore preferable. In addition to these metals, the following elements may be contained therein. For example, metals and semimetals such as Mg, Se, Hf, V, Nb, Ru, W, Mn, Re, Fe, Co, Rh, Ir, Cu, Zn, Cd, Ga, In, Si, Ge, Te, Pb, Po, Sn and Bi can be cited. Among these, material which contains Ag as a principal component is particularly preferable, because it is not expensive to manufacture, has tendency to exhibit increased reflectivity when it is combined with azo-metal chelate dye, and provides white beautiful ground color when a print-receiving layer is provided, which will be described later. Here, the principal component means element accounting for 50% or more of the material. It is also possible that thin films having low refraction index are alternately laminated with thin films having high refraction index to form a multi-layered film by using material composed of other than metals, and this multi-layered film is used as the reflecting layer.

As methods for forming the reflecting layer, sputtering method, ion-plating method, chemical vapor deposition and vacuum deposition can be cited. In addition, publicly known organic or inorganic intermediate layer and adhesion layer can be provided on a substrate or under a reflecting layer in order to enhance reflectivity, improve recording characteristics and enhance adherence.

The materials used for a protection layer formed on a reflecting layer are not particularly limited, as long as the reflecting layer is protected from external forces. For example, thermoplastic resin, thermosetting resin, electron beam curing resin, UV curing resin and the like can be cited as organic substance. Moreover, $SiO_2$, $SiN_4$, $MgF_2$, $SnO_2$ and the like can be cited as inorganic substance. Thermoplastic resin, thermosetting resin or the like may be dissolved into an appropriate solvent to obtain an application solution. The application solution may then be applied to a substrate, followed by drying. In this way, thermoplastic resin, thermosetting resin or the like are formed. UV curing resin may be applied to a substrate as it is and cured by UV light. Alternatively, UV curing resin may be dissolved into an appropriate solvent to prepare an application solution. The application solution may then be applied to the substrate, followed by irradiation with UV light for curing. In this way, UV curing resin is formed. For UV curing resin, acrylate resin such as urethane acrylate, epoxy acrylate and polyester acrylate can be used. Separate use or mixed use of these materials may be possible. Additionally, these materials may be used in a form of a single layer film as well as in a form of a multi-layered film.

As in the case of forming a recording layer, as methods for forming the protection layer, coating methods such as spin coating method and casting method, sputtering method, chemical vapor deposition and the like may be used. Among these methods, spin coating method is preferable. The film thickness of the protection layer generally ranges from 0.1 to 100 μm inclusive. In the present embodiment, the film thickness of the protection film preferably equals to 3 μm or more, more preferably equals to 5 μm or more, whereas preferably 30 μm or less, more preferably 20 μm or less.

Note that, the present embodiment is not limited to the foregoing aspects, and various modifications thereof are possible. For example, an optical recording medium may include two or more recording layers. In addition, methods including the following may be used: a method of bonding a substrate having no grooves, which is called a dummy substrate, to the reflecting layer surface; and a method of bonding two optical recording media together in a state where the reflecting layer surfaces are allowed to come in contact with each other. UV curing resin, inorganic thin film or the like may be formed onto the substrate mirror-finished surface in order to protect the surface and to prevent adherence of dusts and the like. Furthermore, a print-receiving layer can also be formed on the protection layer provided on the reflecting layer, or on the substrate bonded to the reflecting layer surface.

Further, an optical recording medium may be prepared by forming a reflecting layer on a substrate, coating a recording layer thereon, further forming a dielectric layer, a thin metal layer, a protection layer comprising a UV curing resin, a cover layer or the like thereon, and a recording or reading light incidents on the protection or cover layer side.

Recording to the thus obtained optical recording medium is generally performed by applying laser light to the recording layer(s) provided on one surface or on both surfaces of the substrate. Generally, the portions of the recording layer to which laser light is applied thermally deform, that is, decomposition, heat generation, melting and the like are caused by absorption of laser light energy. The recorded information is generally read by reading the reflectivity difference between the portion where thermal deformation owing to laser light has occurred and the portion where thermal deformation has not occurred.

Lasers used for recording and reading are not particularly limited. However, a dye laser that can be tuned to various wavelengths over the visible range, a helium-neon laser with a wavelength of 633 nm, a high-power semiconductor laser with a wavelength of near 680, 660 or 635 nm, which has been developed recently, a blue laser with a wavelength of near 400 nm and a second harmonic YAG laser with a wavelength of 532 nm, and the like can be used. Among these lasers, the semiconductor laser is suitable because it is compact and lightweight, excellent in handleability and advantageous costwise. In an optical recording medium to which the present embodiment is applied, high density recording and reading can be achieved by using one or a plurality of wavelengths selected among these.

EXAMPLES

Hereinafter, a specific description will be given of the present embodiment on the basis of Examples.

However, the present Examples are not intended to limit the present embodiment as long as it does not depart from the scope thereof.

Example 1

Diazo Coupling

Here, 2.7 g of 2-amino-1,3,4-thiadiazole was dissolved into a mixture containing 32 g of acetic acid, 28 g of phosphoric acid and 11 g of sulfuric acid. After cooling the resultant solution to 5° C. or less, 8.7 g of 43% nitrosylsulfuric acid was added dropwise to this solution. In this way, a diazo solution of 2-amino-1,3,4-thiadiazole was prepared. Next, the thus obtained diazo solution was added dropwise to a solution of 150 ml of methanol and 7.5 g of a coupler compound at 5° C. or less, and the resultant solution was stirred for 2 hours. Subsequently, 28% ammonia water was added thereto for neutralization, followed by filtration and purification of the deposited crystal. In this way, 5.0 g of an azo-compound represented by the following structural formula 1a was obtained.

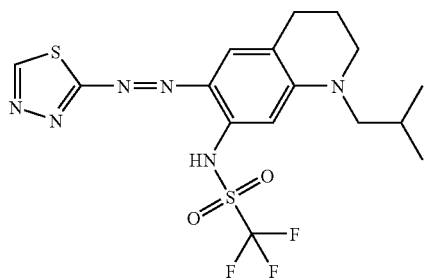

1a

Chelation

Here, 2.0 g of the azo-compound represented by the structural formula 1a was dissolved into 30 ml of tetrahydrofuran (hereinafter referred to as THF). Then, undissolved components were separated by filtration. Next, 0.6 g of zinc acetate dihydrate (II: hereinafter a divalent ion is referred to as "II") was dissolved into 8 ml of methanol. The resultant solution was added dropwise to THF solution containing the azo-compound represented by the structural formula 1a at room temperature. Furthermore, 20 ml of methanol was added dropwise to this solution to deposit a crystal, followed by filtration, washing with methanol and drying of the deposited crystal. In this way, 1.9 g of an aimed azo-zinc chelate dye represented by the following structural formula was obtained.

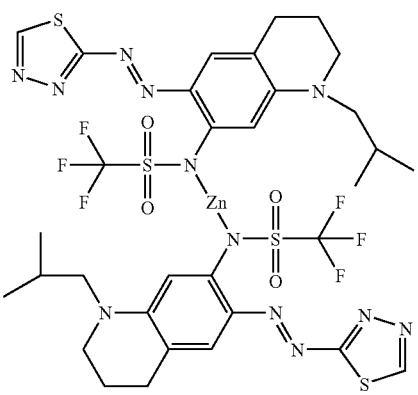

This azo-zinc chelate dye showed the maximum absorption wavelength at 580 nm (in chloroform) and 145 L/gcm absorption coefficient per gram. The coating film of this dye only showed the maximum absorption wavelength at 603.0 nm, and had an OD (light absorbance) value of 0.793.

Here, "film composed of dye only" in all of the Examples was prepared in the following manner. Thus, 20 mg of the above prepared dye was contained in 2 g of octafluoropentanol (OFP) solvent, and was subjected to supersonic dispersion at a temperature in a range of from 50° C. to 55° C. for 60 minutes to obtain solution A. The solution A was cooled to room temperature (25±5° C.), and then filtrated through 0.2 μm filter (manufactured by Millipore Corporation) to obtain solution B. The solution B thus obtained was spin-coated on a polycarbonate substrate having a thickness of 1.2 mm, a groove depth of 170 nm, a groove width of 500 nm and a track pitch of 1,600 nm at a rotating speed of 800 rpm. The film thus coated was maintained in an air-blowing drier chamber at 80° C. for 5 minutes, and was allowed to stand in a room to be cooled to room temperature, thus obtaining a film of dye only (or hereinafter referred to as "coated substrate A" in some cases).

The coated substrate A thus obtained was cut out to have a sector shape and was used as a sample to measure an optical density OD (light absorbance) of the film of dye only. Air was used as a reference sample. Measurement was then made using U-3300 (manufactured by Hitachi, Ltd.). The following measurement conditions were adopted: wavelength scan speed of 300 nm/min; and optical density measuring (absorbance) mode at a sampling cycle of 0.5 nm.

OD is expressed by OD=−log $(I_1/I_0)$ where $I_1$ represents a light intensity of a transmitted light of the coated substrate A and $I_0$ represents a light intensity of a transmitted light of reference sample.

Example 2

1.8 g of an azo compound expressed by the structural formula Ib obtained in the same manner as in Example 1 was dissolved in 40 ml of THF, and was filtrated.

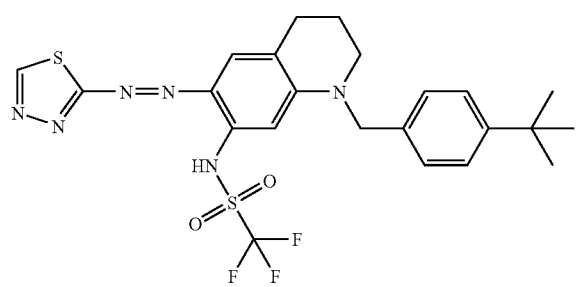

1b

Also, 0.4 g of zinc acetate (II) dihydrate was dissolved in 6 ml of methanol, and was filtrated, and was dropwise added to the above prepared azo solution. Further, 40 ml of methanol was dropwise added thereto to obtain a deposited crystal, and the deposited crystal was filtrated and was washed with THF and methanol, and was dried to obtain 1.7 g of an azo-zinc chelate dye compound having the following structural formula as an aimed compound.

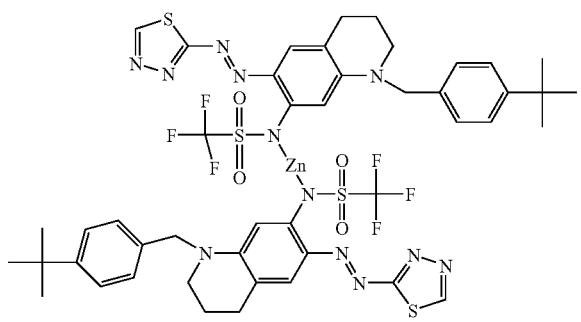

This azo-zinc chelate dye showed the maximum absorption wavelength at 581 nm and had a gram absorption coefficient of 121 L/gcm. The coated film of this dye only showed the maximum absorption wavelength at 605.5 nm, and had an OD (light absorbance) value of 0.707.

Example 3

Diazo Coupling 2.5 g of 2-amino-4,5-dicyano-1,3-imidazole was dissolved in 74 ml of water and 12.3 g of concentrated hydrochloric acid, and was cooled to 5° C. or lower, and a solution having 1.39 g of sodium nitrite dissolved in 5 ml of water was dropwise added thereto to prepare a diazo solution. The diazo solution thus prepared was dropwise added to a solution containing 5.4 g of a coupler compound, 1.1 g of urea and 108 ml of methanol at 5° C. or lower, and was stirred for 2 hours. A crystal deposited was filtrated and was purified to obtain an azo intermediate.

The azo intermediate thus obtained was dissolved in 80 ml of acetone, and 2.1 g of potassium carbonate and 2.7 g of dimethyl sulfate were added thereto, and the resultant mixture was refluxed for 4 hours. A crystal deposited was filtrated and was purified to obtain 7.4 g of an azo compound 1c having the following structural formula.

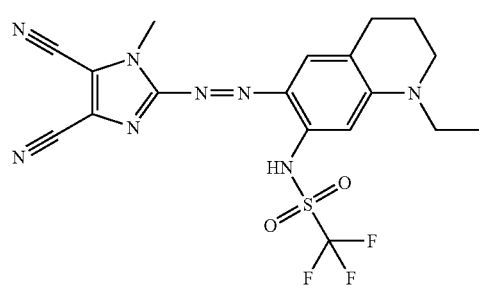

1c 7.4 g of the above obtained azo compound having the structural formula 1c was dissolved in 220 ml of THF and was filtrated.

Further, a solution having 2.1 g of zinc acetate (II) dihydrate dissolved in 30 ml of methanol, was filtrated and was dropwise added to the above prepared azo solution. The reaction solution was concentrated to half volume, and a crystal deposited was filtrated and was washed with methanol and was dried to obtain 3.9 g of an azo-zinc chelate dye compound having the following structural formula as an aimed compound.

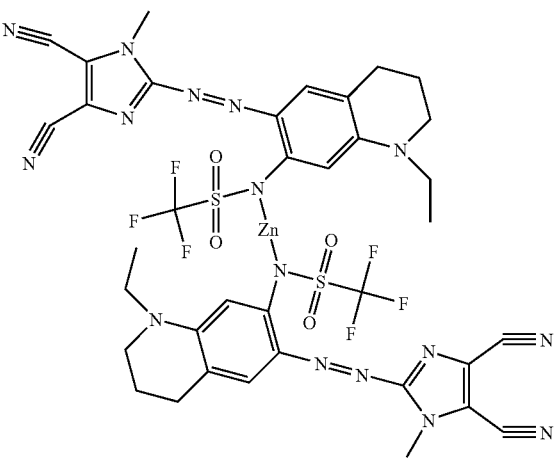

This azo-zinc chelate dye showed the maximum absorption wavelength at 578 nm in chloroform and had a gram absorption coefficient of 153 L/gcm. Also, the coating film of this dye only showed the maximum absorption wavelength at 595.5 nm, and had an OD (light absorbance) value of 0.825.

Example 4

2.0 g of an azo compound having the following structural formula 1d obtained in the same manner as in Example 1 was dissolved in 20 ml of THF and was filtrated.

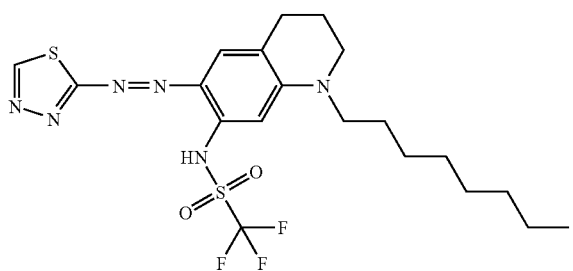

Further, 0.9 g of zinc acetate (II) dihydrate was dissolved in 12 ml of methanol, and was filtrated, and was dropwise added to the above prepared azo solution. Further, 30 ml of methanol was dropwise added thereto to deposit a crystal, and the crystal thus deposited was filtrated and was washed with methanol, and was dried to obtain 1.8 g of an azo-zinc chelate dye compound having the following structural formula as an aimed compound.

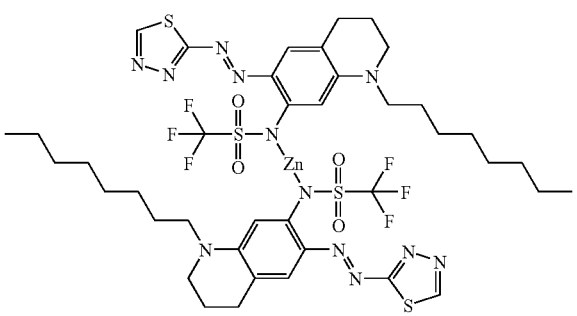

This azo-zinc chelate dye showed the maximum absorption wavelength at 579 nm in chloroform and had a gram absorption coefficient of 128 L/gcm. Also, the coating film of this dye only showed the maximum absorption wavelength at 603.5 nm, and had an OD (light absorbance) value of 0.768.

Example 5

1.8 g of an azo compound having the following structural formula 1e obtained in the same manner as in Example 1 was dissolved in 40 ml of THF and was filtrated.

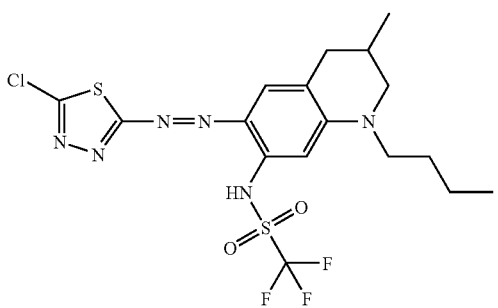

Also, 0.5 g of zinc acetate (II) dihydrate was dissolved in 7 ml of methanol, and was filtrated, and was dropwise added to the above prepared azo solution. The reaction solution was concentrated and was dissolved in 5 ml of THF. Further, 20 ml of methanol was dropwise added thereto to deposit a crystal, and the crystal thus deposited was filtrated and was washed with methanol, and was dried to obtain 1.0 g of an azo-zinc chelate dye compound having the following structural formula as an aimed compound.

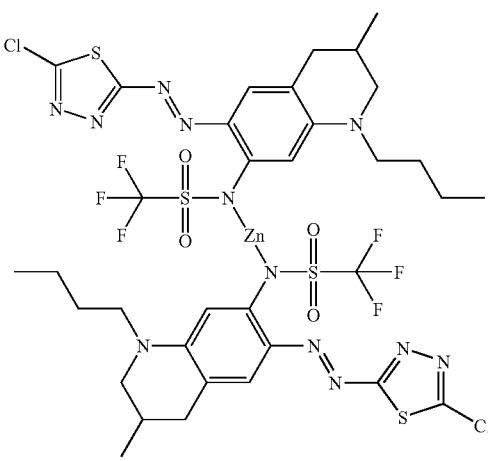

This azo-zinc chelate dye showed the maximum absorption wavelength at 590 nm in chloroform and had a gram absorption coefficient of 127 L/gcm. Also, the coating film of this dye only showed the maximum absorption wavelength at 609.0 nm, and had an OD (light absorbance) value of 0.777.

All of dye retention rates of dyes of Examples 1 to 6 were 0%.

Example 6

A recording layer (50 nm film thickness in groove) comprising 40 wt % of an azo-metal chelate dye (dye A) comprising nickel (II) and two azo compounds having the following structural formula (A) and 60 wt % of an azo-metal chelate dye comprising zinc (II) and two azo compounds having the following structural formula (1a) of Example 1 was spin-coated on a polycarbonate substrate having a thickness of 0.6 mm and having a guide groove of 160 nm groove depth, 320 nm groove width and 0.74 μm track pitch in such a manner as to provide a recording layer thickness having an optical density (light absorbance at a wavelength of 598 nm measured by using air as a reference sample) of 0.65. The coating solution was a TFP solution having a density of 1.3 wt %, and the spin-coating rotation number was 1,000 rpm to 2,500 rpm.

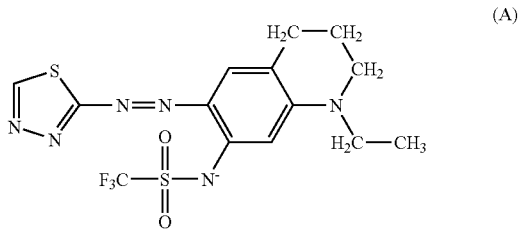

-continued

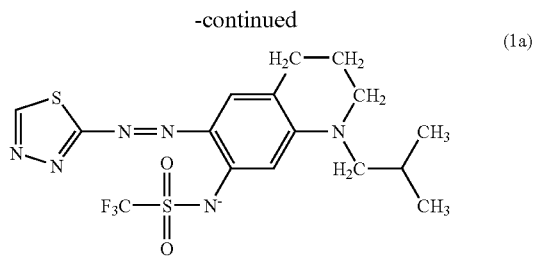
(1a)

Thereafter, silver (Ag) was deposited thereon by sputtering method to form an Ag reflecting layer having a thickness of 120 nm. At the time of sputtering, an argon pressure was reduced than usually known film-forming condition of a reflecting layer to raise a charging power. Further, a UV curing resin (KAYARAD SPC-920 manufactured by Nippon Kayaku Co., Ltd.) was spin-coated on this reflecting layer and was cured to form a protection layer of 10 μm. Two sheets of the laminates thus obtained were bonded in such a manner as to make the substrate side outside by using a UV curable type adhesive (SK7100, manufactured by Sony Chemicals Corp.) to produce an optical recording medium.

Dye retention rates of a coating film of dye A only and a coating film of azo-zinc chelate dye of the formula 1a only were 90.4% and 0% respectively, and a recording monolayer of a mixture of these two dyes in the above ratio had a dye retention rate of 56%.

By using the optical recording medium thus obtained, random signal recording of EFM plus modulation having the shortest mark length of 0.4 μm was performed at a recording speed of 56.0 m/s (16 times speed of DVD-R) under recording pulse strategy conditions as defined in DVD-R Specification for General Ver. 2.1 or DVD+R Specification Ver. 1.20 using a recording-reproducing apparatus having a wavelength of 650 nm and a numerical aperture of 0.65. A laser irradiation pulse width for 3T mark length recording was 6.5 ns. A signal of the recorded part was reproduced by the same measuring machine to measure a margin (recording power margin of jitter and asymmetry margin of jitter).

Figure 1B:
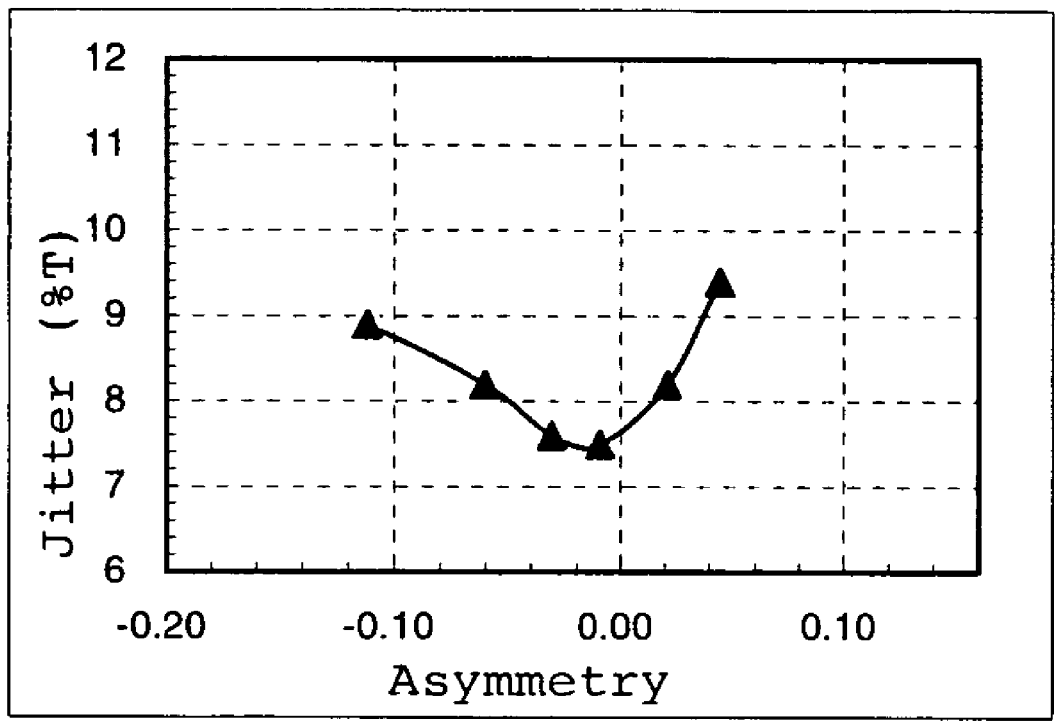

The measurement result of the recording power margin is shown in FIG. 1(a), and the measurement result of the asymmetry margin is shown in FIG. 1(b). As evident from FIG. 1(a) and 1(b), the optical recording medium of the present example provided a bottom jitter value of 7.4% which was quite satisfactory. Recording power margin at the jitter value of 10% exceeded 5 mW, such being satisfactory. Also, asymmetry margin at the jitter value of 9% was about 16%, and the jitter was about 9% at the asymmetry value of about 5%, such also being satisfactory.

The "dye retention rate" used herein means a ratio of light absorbance (OD) before and after the above-mentioned light resistance test, i.e. Wool scale 5 grade (light resistance test) under light irradiation conditions as defined in accordance with ISO-105-B02, that is, {(light absorbance after test)/(light absorbance before test)}×100(%), at the maximum absorption wavelength of the above-mentioned dye only film in a wavelength zone of from 300 to 800 nm.

The measurement of light absorbance (OD) is already mentioned above.

All of dye retention rates of the dyes of Examples 2 to 5 were 0%.

Comparative Example 1

An optical recording medium was prepared in the same procedure as in Example 1, except that the azo-zinc chelate dye in Example 6 was replaced by the azo-nickel chelate dye C (Ni is a divalent ion: $Ni^{2+}$) having a "satisfactory light resistance" which coordinated two azo type compounds having the following structure formula (f) and that a mixture of dye A and dye C at a ratio of 50 wt %: 50 wt % was used. The recording layer thus obtained had a film thickness in groove of 30 nm.

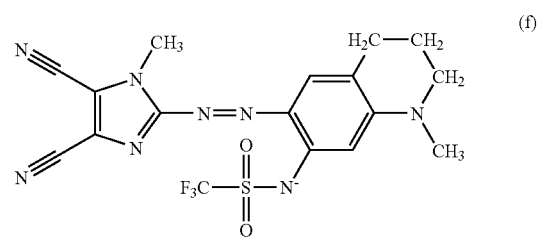
(f)

The coating film of dye C only had a dye maintenance rate of 87.3%, and the recording film of a mixture of dye A and dye C of above-mentioned ratio had a dye retention rate of 89.0%.

By using this optical recording medium, recording and reproducing were performed under the same conditions as in Example 1 to measure margins (recording power margin and asymmetry margin).

Figure 2A:
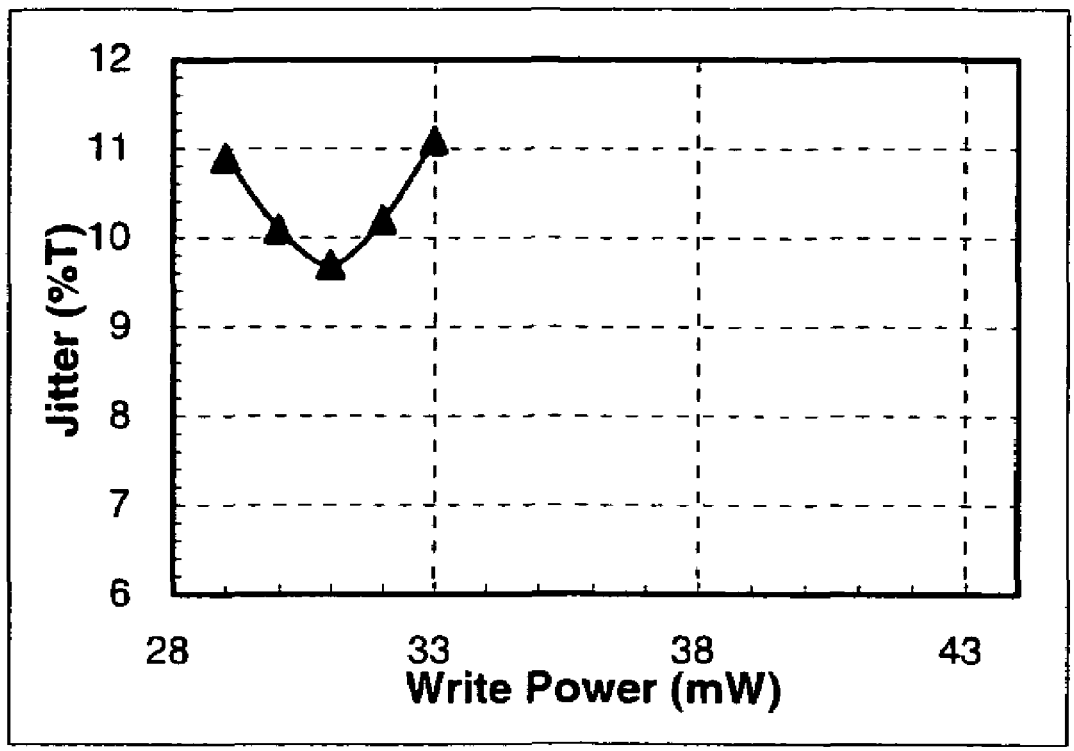
FIGS. 2(a) and 2(b) illustrate recording properties of the optical recording medium of Comparative Example 1.
Figure 2B:
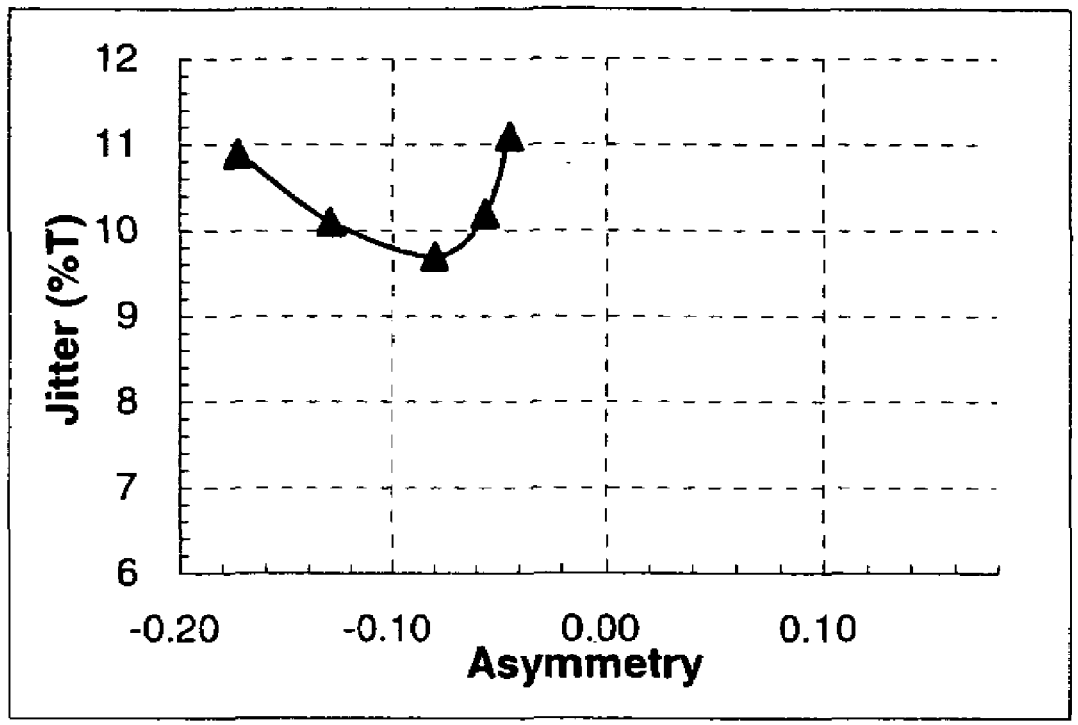

The measurement result of recording power margin is shown in FIG. 2(a), and the measurement result of asymmetry margin is shown in FIG. 2(b). As evident from FIGS. 2(a) and 2(b), the bottom jitter was at least 9.5%, and the power margin at jitter value of 10% is 2 mW, and accordingly it is evident that both of power margin and asymmetry margin are not satisfactory. It was observed that the asymmetry margin was degraded even at such a low recording power of asymmetry of −5%. Evidently dye C deteriorates high speed recording performance as compared with dye B of the present Examples.

Also, by using an optical recording medium having a recording layer comprising dye A only, recording and reproducing were performed under the same pulse strategy conditions as in Example 6, but its power margin was narrow and such a satisfactory result as in Example 6 could not be achieved.

As mentioned above, it is evident that satisfactory recording performances including a favorable recording power margin can be achieved in high speed recording by employing a recording layer including the azo-metal chelate dye of the present invention.

Example 7

An optical recording medium was obtained in the same procedure as in Comparative Example 1, except that the azo-nickel chelate dye of dye C was replaced by the azo-zinc chelate dye of Example 3. The recording layer thus obtained had a film thickness in groove of 30 nm. The OD value of the recording layer only at 598 nm was 0.68.

16× recording performed in the same manner as in Example 6 provided a recording sensitivity of 41 mW and a jitter of 7.9%, and proved satisfactory high speed recording performances. Also, 1× recording provided a recording sensitivity of 7.0 mW and a jitter of 8.5%, and satisfactory recording performances were proved at such a very wide recording speed as 1× and 16×.

Example 8

An optical recording medium was obtained in the same procedure as in Example 7, except that the azo-zinc chelate dye of Example 2 was employed in place of the azo-zinc chelate dye of Example 3 used in Example 7. The recording layer thus obtained had a film thickness in groove of 30 nm. The OD value of the recording layer only at 598 nm was 0.68.

16× recording performed in the same manner as in Example 6 provided a recording sensitivity of 40 mW and a jitter of 7.9%, and proved satisfactory high speed recording performances.

Example 9

An optical recording medium was obtained in the same procedure as in Example 7, except that the azo-zinc chelate dye of Example 4 was employed in place of the azo-zinc chelate dye of Example 3 used in Example 7. The recording layer thus obtained had a film thickness in groove of 30 nm. The OD value of the recording layer only at 598 nm was 0.68.

16× recording performed in the same manner as in Example 6 provided a recording sensitivity of 40 mW and a jitter of 7.9%, and proved satisfactory high speed recording performances. Also, 1× recording provided a recording sensitivity of 6.0 mW and a jitter of 9.0%. The jitter of this 1× recording is improved by adjusting recording pulse strategy.

Example 10

A recording layer (30 nm film thickness in groove) of 100 wt % of an azo-metal chelate dye (i.e. azo-zinc chelate dye of Example 5) comprising zinc (II) and two azo compounds 1e of Example 5 was spin-coated on a polycarbonate substrate having a thickness of 0.6 mm and having a guide groove of 160 nm groove depth, 320 nm groove width and 0.74 μm track pitch in such a manner as to provide a coating thickness of showing a light absorbance (optical density: light absorbance at a wavelength of 598 nm measured by using air as a reference sample) of 0.68. The coating solution is a TFP solution having a concentration of 1.3 wt %, and the rotation speed of spin-coating was from 1,000 rpm to 7,000 rpm. The succeeding steps were the same as in Example 6 to obtain an optical recording medium. By using this optical recording medium, 16× recording and 1× recording were performed in the same manner as in Example 9. The 16× recording provided a recording sensitivity of 39 mW and a jitter of 7.7%, which were satisfactory. The 1× recording provided a recording sensitivity of 6.5 mW and a jitter of 9.5%, and they are improved by adjusting recording pulse strategy.

Example 11

An optical recording medium was obtained in the same manner as in Example 6, except that the weight ratio of (dye A):(azo-metal chelate dye comprising zinc (II) and two azo compounds 1a (i.e. azo-zinc chelate dye of Example 1)) was changed to 50:50. By using this optical recording medium, 16× recording and 1× recording were performed in the same manner as in Example 9. The 16× recording provided a recording sensitivity of 37 mW and a jitter of 7.6%, which were satisfactory. The 1× recording provided a recording sensitivity of 6.0 mW and a jitter of 8.7%, which were satisfactory.

A jitter spec value of DVD+R is defined to be at most 9%, and a jitter spec value of DVD-R is defined to be at most 8%.

As mentioned above, it is proved that the specific azo-metal chelate dye of the present invention is excellent in high speed recording performances.

Thus, the present invention provides an azo-metal chelate dye capable of high speed recording and an optical recording medium using this azo-metal chelate dye capable of high speed recording.

What is claimed is:

1. An optical recording medium for recording and reading with a semiconductor laser light of 300 nm to 700 nm, which has a recording layer containing an azo-metal chelate dye formed from a ligand having active hydrogen in $X^1$ or $X^2$ eliminated from an azo compound of the following formula (III) and $Zn^{2+}$ ion,

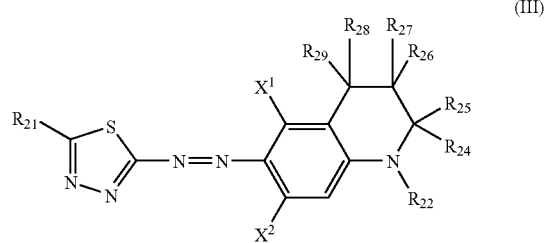

(III)

wherein in the above formula (III), $R_{21}$ is a hydrogen atom, a halogen atom or an ester group expressed by $CO_2R_{23}$ in which $R_{23}$ is a linear or branched alkyl group or a cycloalkyl group; $R_{22}$ is a linear or branched alkyl group which may have a substituent; one of $X^1$ and $X^2$ is a $NHSO_2Y$ group in which Y is a linear or branched alkyl group substituted with at least 2 fluorine atoms, and the other is a hydrogen atom; $R_{24}$ and $R_{25}$ are respectively independently a hydrogen atom or a linear or branched alkyl group which may have a substituent; $R_{26}$, $R_{27}$, $R_{28}$ and $R_{29}$ are respectively independently a hydrogen atom or a $C_1$-$C_2$ alkyl group which may have a substituent; and the $NHSO_2Y$ group forms a $NSO_2Y^-$ (negative) group by eliminating $H^+$, and an azo compound of the above formula (III) forms a coordinate bond with a metal ion.

2. The optical recording medium according to claim 1, wherein a dye layer has a retention ratio of light absorbance persistent values of at most 20% as measured before and after being subjected to a light resistance test of Wool scale 5 Class under light irradiation conditions of ISO-105-B02.

3. A method for recording on and reading an optical recording medium, comprising applying a semiconductor laser light of 300 nm to 700 nm to the optical recording medium of claim 1.

4. The optical recording medium according to claim 1, wherein $R_{21}$ is hydrogen or halogen.

5. The optical recording medium according to claim 1, wherein Y is trifluoromethyl or 2,2,2-trifluoroethyl.

6. The optical recording medium according to claim 1, wherein $R_{24}$ and $R_{25}$ are independently hydrogen, methyl, ethyl or methoxy.

7. The optical recording medium according to claim 1, wherein $R_{22}$ is unsubstituted $C_1$-$C_6$ linear alkyl or $C_3$-$C_8$ branched alkyl.

8. The optical recording medium according to claim 1, wherein $R_{26}$, $R_{27}$, $R_{28}$ and $R_{29}$ are hydrogen.

9. In a method of making an optical recording medium comprising a recording layer, the improvement comprising forming the recording layer containing an azo-metal chelate dye formed from a ligand having active hydrogen in $X^1$ or $X^2$ eliminated from an azo compound of the following formula (III) and $Zn^{2+}$ ion,

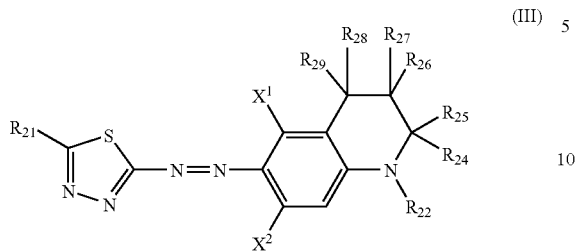

wherein in the above formula (III), $R_{21}$ is a hydrogen atom, a halogen atom or an ester group expressed by $CO_2R_{23}$ in which $R_{23}$ is a linear or branched alkyl group or a cycloalkyl group; $R_{22}$ is a linear or branched alkyl group which may have a substituent; one of $X^1$ and $X^2$ is a $NHSO_2Y$ group in which Y is a linear or branched alkyl group substituted with at least 2 fluorine atoms, and the other is a hydrogen atom; $R_{24}$ and $R_{25}$ are respectively independently a hydrogen atom or a linear or branched alkyl group which may have a substituent; $R_{26}$, $R_{27}$, $R_{28}$ and $R_{29}$ are respectively independently a hydrogen atom or a $C_1$-$C_2$ alkyl group which may have a substituent; and the $NHSO_2Y$ group forms a $NSO_2Y^-$ (negative) group by eliminating $H^+$, and an azo compound of the above formula (III) forms a coordinate bond with a metal ion.

* * * * *